US012756919B2

(12) United States Patent
Oomine et al.

(10) Patent No.: US 12,756,919 B2
(45) Date of Patent: Oct. 6, 2026

(54) INFORMATION PROCESSING APPARATUS WITH A CAMERA AND AN ADJUSTABLE ILLUMINATOR, INFORMATION PROCESSING METHOD, AND NON-TRANSITORY RECORDING MEDIUM

(71) Applicants: NEC Corporation, Tokyo (JP); NEC Platforms, Ltd., Kawasaki (JP)

(72) Inventors: Masahiro Oomine, Kanagawa (JP); Daisuke Shimada, Kanagawa (JP); Katsumi Kayama, Kanagawa (JP); Yuta Komamura, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 61 days.

(21) Appl. No.: 18/849,068

(22) PCT Filed: Mar. 22, 2022

(86) PCT No.: PCT/JP2022/013263

§ 371 (c)(1),
(2) Date: Sep. 20, 2024

(87) PCT Pub. No.: WO2023/181130

PCT Pub. Date: Sep. 28, 2023

(65) Prior Publication Data

US 2025/0240510 A1 Jul. 24, 2025

(51) Int. Cl.
*H04N 23/56* (2023.01)
*G06T 5/80* (2024.01)
(Continued)

(52) U.S. Cl.
CPC ............... *H04N 23/56* (2023.01); *G06T 5/80* (2024.01); *G06V 10/141* (2022.01); *H04N 23/61* (2023.01); *H04N 23/695* (2023.01)

(58) Field of Classification Search
CPC ...... H04N 23/56; H04N 23/61; H04N 23/695; H04N 23/00; G06T 5/80; G06V 10/141
See application file for complete search history.

(56) References Cited

U.S. PATENT DOCUMENTS 11,930,280 B2 3/2024 Fujikawa et al.
2002/0191076 A1 12/2002 Wada et al.
(Continued)

FOREIGN PATENT DOCUMENTS

CN 111182210 B 4/2021
CN 113689734 A 11/2021
(Continued)

OTHER PUBLICATIONS

Extended European Search Report for EP Application No. 22933276.2, dated on Nov. 19, 2025.
(Continued)

*Primary Examiner* — Mekonnen D Dagnew

(57) ABSTRACT

An information processing apparatus includes: a camera that captures a target; an illuminator that applies illumination light in response to capturing is performed by the camera; and an illumination range change unit that changes an illumination range of the illuminator based on a position of the target. According to the information processing apparatus, the target can be properly illuminated with the illumination light based on the position of the target, and it is thus possible to acquire the image of the target, more properly, even when the position of the target in the capturing is changed, for example.

16 Claims, 30 Drawing Sheets

(51) Int. Cl.

| | |
|---|---|
| ***G06V 10/141*** | (2022.01) |
| ***H04N 23/61*** | (2023.01) |
| ***H04N 23/695*** | (2023.01) |

(56) References Cited

U.S. PATENT DOCUMENTS

| | | | | |
|---|---|---|---|---|
| 2016/0241764 | A1 | 8/2016 | Luo et al. | |
| 2021/0042401 | A1 * | 2/2021 | Nagai | G06T 7/521 |

FOREIGN PATENT DOCUMENTS

| | | | |
|---|---|---|---|
| EP | 4109871 | A1 | 12/2022 |
| EP | 4111960 | A1 | 1/2023 |
| JP | 2001-268416 | A | 9/2001 |
| JP | 2002-125142 | A | 4/2002 |
| JP | 2003-002137 | A | 1/2003 |
| JP | 2007-295946 | A | 11/2007 |
| JP | 2012-247527 | A | 12/2012 |
| JP | 2021-021867 | A | 2/2021 |
| WO | 97/21188 | A1 | 6/1997 |
| WO | 2021/106447 | A1 | 6/2021 |
| WO | 2021/166221 | A1 | 8/2021 |
| WO | 2021/171505 | A1 | 9/2021 |

OTHER PUBLICATIONS

International Search Report for PCT Application No. PCT/JP2022/013263, mailed on Jun. 14, 2022.

* cited by examiner

20: MIRROR

INFORMATION PROCESSING APPARATUS WITH A CAMERA AND AN ADJUSTABLE ILLUMINATOR, INFORMATION PROCESSING METHOD, AND NON-TRANSITORY RECORDING MEDIUM

This application is a National Stage Entry of PCT/JP2022/013263 filed on Mar. 22, 2022, the contents of all of which are incorporated herein by reference, in their entirety.

TECHNICAL FIELD

This disclosure relates to technical fields of an information processing apparatus, an information processing method, and a recording medium.

BACKGROUND ART

A known apparatus of this type controls lighting/illumination when a target is captured. For example, Patent Literature 1 discloses a configuration in which a light source position is moved in conjunction with a motion vector of a subject extracted from a captured image. Patent Literature 2 discloses that a position of a left eye or a right eye is detected from a captured image of a wide-angle camera, and that fine adjustment of a tilt position or a pan position is performed such that converged illumination light is applied to an iris.

CITATION LIST

Patent Literature

Patent Literature 1: JP2007-295946A
Patent Literature 2: JP2002-125142A

SUMMARY

Technical Problem

This disclosure aims to improve the techniques/technologies disclosed in Citation List.

Solution to Problem

An information processing apparatus according to an example aspect of this disclosure includes: a camera that captures a target; an illuminator that applies illumination light in response to capturing is performed by the camera; and an illumination range change unit that changes an illumination range of the illuminator based on with a position of the target.

An information processing method according to an example aspect of this disclosure is an information processing method that is executed by at least one computer, the information processing method including: changing an illumination range of an illuminator that applies illumination light based on a position of a target; and controlling a camera to image the target.

A recording medium according to an example aspect of this disclosure is a recording medium on which a computer program that allows at least one computer to execute an information processing method is recorded, the information processing method including: changing an illumination range of an illuminator that applies illumination light based on a position of a target; and controlling a camera to image the target.

DESCRIPTION OF EXAMPLE EMBODIMENTS

Hereinafter, an information processing apparatus, an information processing method, and a recording medium according to example embodiments will be described with reference to the drawings.

First Example Embodiment

An information processing apparatus according to a first example embodiment will be described with reference to FIG. 1 to FIG. 3.

Hardware Configuration

First, with reference to FIG. 1, a hardware configuration of the information processing apparatus according to the first example embodiment will be described. FIG. 1 is a block diagram illustrating the hardware configuration of the information processing apparatus according to the first example embodiment.

Figure 1:
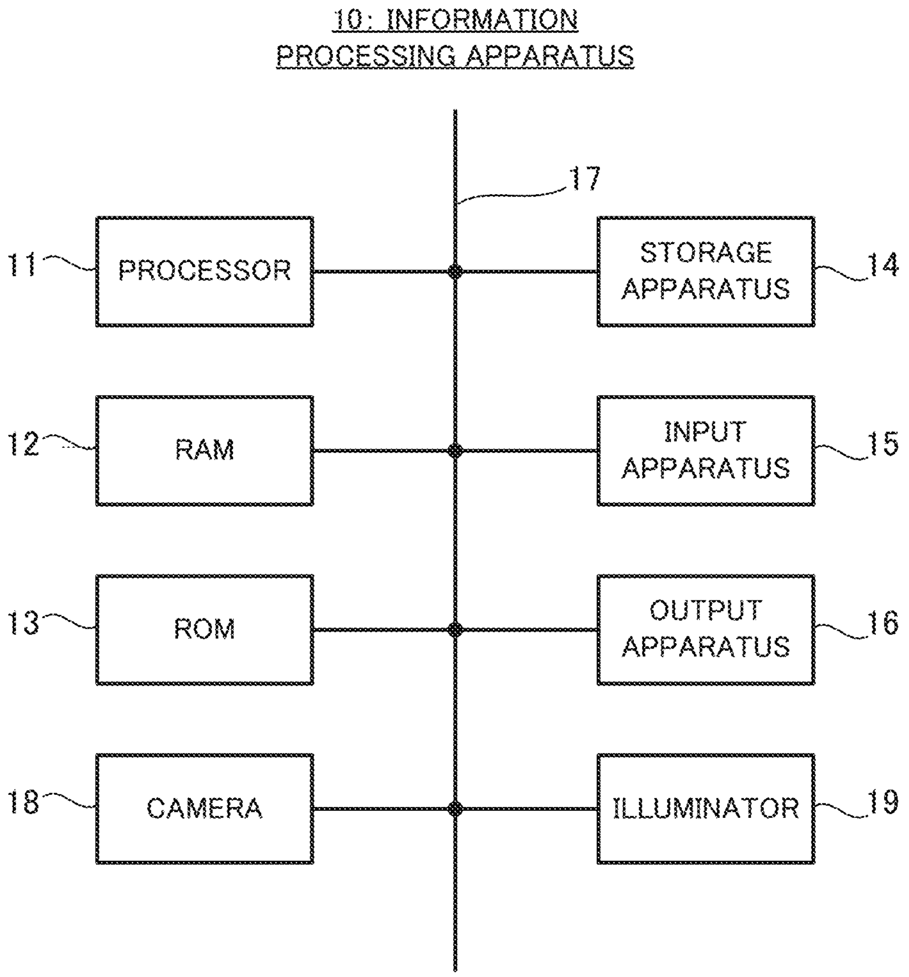
FIG. 1 is a block diagram illustrating a hardware configuration of an information processing apparatus according to a first example embodiment.

As illustrated in FIG. 1, an information processing apparatus 10 according to the first example embodiment includes a processor 11, a RAM (Random Access Memory) 12, a ROM (Read Only Memory) 13, and a storage apparatus 14. The information processing apparatus 10 may further include an input apparatus 15 and an output apparatus 16. The information processing apparatus 10 includes a camera 18 and an illuminator 19. The processor 11, the RAM 12, the ROM 13, the storage apparatus 14, the incoming apparatus 15, the outgoing apparatus 16, the camera 18, and the illuminator 19 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the information processing apparatus 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for capturing an image of a target by controlling an illuminator is realized or implemented in the processor 11. As described above, the processor 11 may function as a controller for executing each control in the information processing apparatus 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores data that are temporarily used by the processor 11 when the processor 11 executes the computer program. The RAM 12 may be, for example, a D-RAM (Dynamic Random Access Memory) or a SRAM (Static Random Access Memory). Furthermore, another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Furthermore, another type of non-volatile memory may also be used instead of the ROM 13.

The storage apparatus 14 stores data that are stored by the information processing apparatus 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing apparatus 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the information processing apparatus 10 to the outside. For example, the output apparatus 16 may be a display apparatus (e.g., a display) that is configured to display the information about the information processing apparatus 10. The output apparatus 16 may be a speaker or the like that is configured to audio-output the information about the information processing apparatus 10. The output apparatus 16 may be configured as a portable terminal such as a smartphone and a tablet. The output apparatus 16 may be an apparatus that outputs information in a form other than an image. For example, the output apparatus 16 may be a speaker that audio-outputs the information about the information processing apparatus 10.

The camera 18 is configured to capture an image of a target. The target here is not limited to a human being, but may include an animal such as a dog, a cat, a snake, and a bird, and a robot, or the like. The camera 18 may capture an entire image of the target, or may capture a part of the target. The camera 18 may capture an image of a face of the target, or may capture an image including an eye (iris) of the target, for example. The camera 18 may be configured as a visible light camera or as a near infrared camera. The camera 18 may be a camera that captures a still image, or a camera that captures a video. Furthermore, a plurality of cameras 18 may be provided. In this case, the plurality of cameras may be configured to be of other types of cameras. For example, one camera 18 may be configured as a face camera capturing a face image of the target, and another camera 18 may be configured as an iris camera capturing an iris image of the target.

The illuminator 19 is configured to apply illumination light in response to capturing is performed by the camera 18. A specific configuration of the illuminator 19 is not particularly limited, but may be configured by an incandescent lamp, a fluorescent lamp, a LED light, or the like, for example. Furthermore, a plurality of illuminators 19 may be provided, or a plurality of types of illuminators 19 may be provided. In particular, the illuminator 19 according to the present example embodiment is configured to change an illumination/illumination range of the illumination light. For example, the illuminator 19 is configured to change the illumination range by changing a direction (angle) thereof. Alternatively, the illuminator 19 may be configured to change the illumination range by widening or narrowing the illumination range. Alternatively, the illuminator 19 may be configured to change the illumination range by changing intensity of brightness. In this case, the illuminator 19 may change the intensity of the brightness not only by changing the amount of the illumination light applied from one bulb, but also by changing the number of bulbs that emit light.

Functional Configuration

Next, a functional configuration of the information processing apparatus 10 according to the first example embodiment will be described with reference to FIG. 2. FIG. 2 is a block diagram illustrating the functional configuration of the information processing apparatus according to the first example embodiment.

The information processing apparatus 10 according to the first example embodiment is configured to be an apparatus that captures an image of a target. Although there is no particular limitation on the use of the captured image, it may be used for biometric authentication of the target, for example. Specifically, the information processing apparatus 10 may capture the face image of the target and may perform face authentication processing using the face image. Alternatively, the information processing apparatus 10 may capture the iris image of the target and may perform iris authentication processing using the iris image. Alternatively, the information processing apparatus 10 may capture both the face image and the iris image of the target and may perform multimodal authentication processing using both the face image and the iris image.

Figure 2:
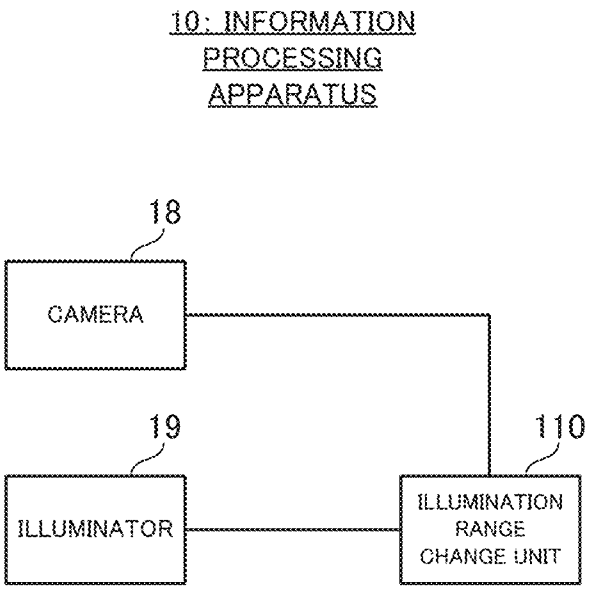
FIG. 2 is a block diagram illustrating a functional configuration of the information processing apparatus according to the first example embodiment.

As illustrated in FIG. 2, the information processing apparatus 10 according to the first example embodiment includes, as components for realizing the functions thereof, the camera 18 and the illuminator 19 already described, and an illumination range change unit 110. The illumination range change unit 110 may be a processing block realized or implemented by the processor 11 (see FIG. 1), for example.

The illumination range change unit 110 is configured to change the illumination range of the illumination light by the illuminator 19. Specifically, the illumination range change unit 110 is configured to change the illumination range of the illuminator 19 based on a position of the target. The illumination range change unit 110 may acquire the position of the target from the image captured by the camera 18 and may change the illumination range of the illuminator 19 based on the position, for example. Alternatively, the illumination range change unit 110 may acquire the position of the target by using various sensors other than the camera 18 and may change the illumination range of the illuminator 19 based on the position. The illumination range change unit 110 may be configured to change an angle of the illuminator 19 and change the illumination range by using a driving force of a motor or the like, for example. A specific configuration for changing the illumination range will be described in detail in another example embodiment later.

Capturing Operation

Next, with reference to FIG. 3, a flow of an capturing operation (i.e., an operation when the image of the target is captured) by the information processing apparatus 10 according to the first example embodiment will be described. FIG. 3 is a flowchart illustrating the flow of the capturing operation by the information processing apparatus according to the first example embodiment.

Figure 3:
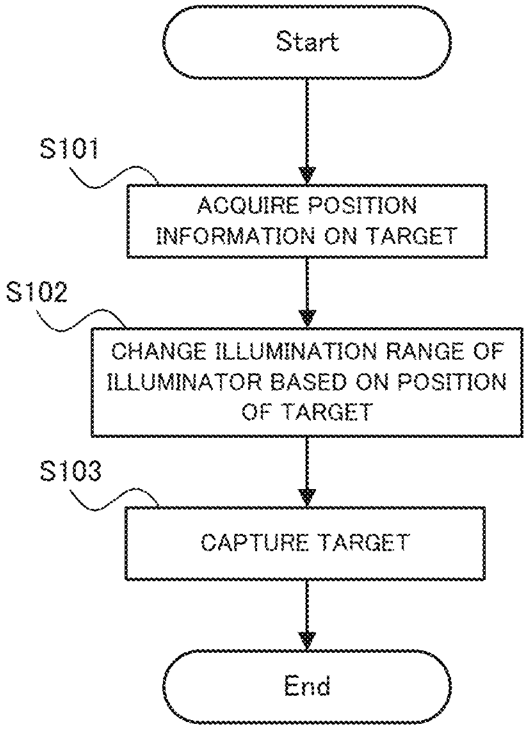
FIG. 3 is a flowchart illustrating a flow of an capturing operation by the information processing apparatus according to the first example embodiment.

As illustrated in FIG. 3, when the capturing operation by the information processing apparatus 10 according to the first example embodiment is started, first, the illumination range change unit 110 acquires the position of the target (step S101). An example of the position of the target is a standing position of the target. The standing position of the target may be acquired as a relative position to the camera 18, for example. Alternatively, as the position of the target, a position of a part of a living body of the target may be acquired. For example, a position of a face or a position of an eye of the target may be acquired as the position of the target. In this case, the position of the target may include information about a height of the face and a height of the eye of the target.

Next, the illumination range change unit 110 changes the illumination range of the illuminator 19 based on the position of the target (step S102). The illumination range change unit 110 may change the illumination range toward the position of the target, for example. For example, when the face of the target is captured, the illumination range change unit 110 may change the illumination range of the illuminator 19 so as to illuminate the face of the target with the illumination light. Alternatively, when the eye of the target is captured, the illumination range change unit 110 may change the illumination range of the illuminator 19 so as to illuminate the eye of the target with the illumination light. In a case where an appropriate image is captured when the face and the eye of the target is not directly irradicated with the illumination light, however, the illumination range change unit 110 may change the illumination target so as to apply the illumination light in a position slightly deviated from the target.

Next, the camera 18 captures the image of the target (step S103). The camera 18 may capture a plurality of images of the target. For example, the camera 18 may start the capturing at timing when the target arrives at a predetermined position, and may capture a predetermined number of images. When the target is moving, a series of processing steps described above may be repeated. That is, the series of processing steps may be repeated at each time when the position of the target changes. Specifically, for example, the position of the target may be acquired in predetermined intervals, the illumination range of the illuminator 19 may be changed at each time, and then, the image of the target may be captured.

Technical Effect

Next, a technical effect obtained by the information processing apparatus 10 according to the first example embodiment will be described.

As described in FIG. 1 to FIG. 3, in the information processing apparatus 10 according to the first example embodiment, an illumination position of the illuminator 19 is changed based on the position of the target, and then, the target is captured. In this way, even when the position of the target in the capturing is different from an initial illumination position, the target may be properly illuminated with the illumination light, and it is thus possible to capture the image of the target, more properly.

Second Example Embodiment

The information processing apparatus 10 according to a second example embodiment will be described with reference to FIG. 4 and FIG. 5. The second example embodiment is partially different from the first example embodiment only in the configuration and operation, and may be the same as the first example embodiment in the other parts. For this reason, a part that is different from the first example embodiment will be described in detail below, and a description of the other overlapping parts will be omitted as appropriate.

Functional Configuration

First, with reference to FIG. 4, a functional configuration of the information processing apparatus 10 according to the second example embodiment will be described. FIG. 4 is a block diagram illustrating the functional configuration of the information processing apparatus according to the second example embodiment. In FIG. 4, the same components as those illustrated in FIG. 2 carry the same reference numerals.

Figure 4:
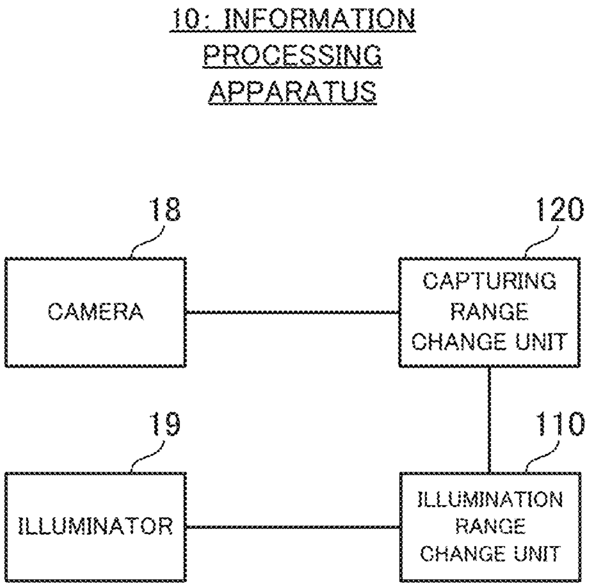
FIG. 4 is a block diagram illustrating a functional configuration of an information processing apparatus according to a second example embodiment.

As illustrated in FIG. 4, the information processing apparatus 10 according to the second example embodiment includes, as components for realizing the functions thereof, the camera 18, the illuminator 19, the illumination range change unit 110, and an capturing range control unit 120. That is, the information processing apparatus 10 according to the second example embodiment further includes the capturing range change unit 120 in addition to the configuration in the first example embodiment (see FIG. 2). The capturing range change unit 120 may be a processing block realized or implemented by the processor 11 (see FIG. 1), for example.

The capturing range change unit 120 is configured to change an capturing range of the camera 18. Specifically, the capturing range change unit 120 is configured to change the capturing range of the camera 18 based on the position of the target. The capturing range change unit 120 may acquire the position of the target from the image captured by the camera 18 and may change the capturing range of the camera 18 based on the position. Alternatively, the capturing range change unit 120 may acquire the position of the target by using various sensors other than the camera 18 and may change the capturing range of the camera 18 based on the position. The capturing range change unit 120 may be configured to change an angle of the camera 18 and change the capturing range by using a driving force of a motor or the like, for example. Alternatively, the capturing range change unit 120 may be configured to change the capturing range by driving a mirror located in the capturing range of the camera 18 (details of which will be described in another example embodiment later).

Capturing Operation

Next, with reference to FIG. 5, a flow of the capturing operation by the information processing apparatus 10 according to the second example embodiment will be described. FIG. 5 is a flowchart illustrating the flow of the capturing operation by the information processing apparatus according to the second example embodiment. In FIG. 5, the same steps as those illustrated in FIG. 3 carry the same reference numerals.

Figure 5:
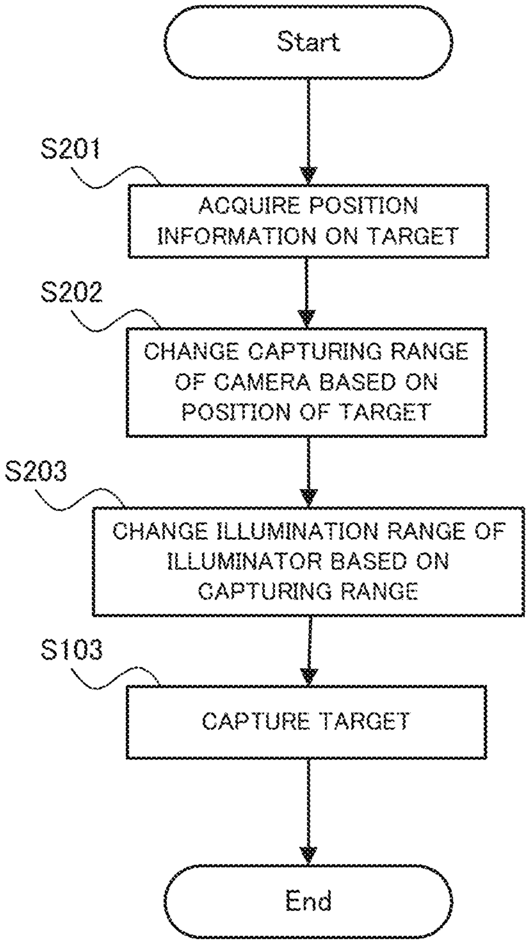
FIG. 5 is a flowchart illustrating a flow of the capturing operation by the information processing apparatus according to the second example embodiment.

As illustrated in FIG. 5, when the capturing operation by the information processing apparatus 10 according to the second example embodiment is started, first, the capturing range change unit 120 acquires the position of the target (step S201). The capturing range change unit 120 changes the capturing range of the camera 18 based ib the position of the target (step S202). The capturing range change unit 120 may change the capturing range toward the position of the target, for example. For example, when the face of the target is captured, the capturing range change unit 120 may change the direction of the camera 18 such that the face of the target is included in the capturing range. Alternatively, when the eye of the target is captured, the capturing range change unit 120 may change the direction of the camera 18 such that the eye of the target is included in the capturing range.

Subsequently, the illumination range change unit 110 changes the illumination range of the illuminator 19 on the basis of the capturing range of the camera 18 (step S203). For example, the illumination range change unit 110 may change the illumination range of the illuminator 19 in the same direction as a direction of changing the capturing range of the camera 18. The illumination range change unit 110 may change the illumination range of the illuminator 19 on the basis of a change amount of the capturing range of the camera 18 (e.g., a change in the angle). The camera 18 then captures the image of the target (step S103).

When the target is moving, a series of processing steps described above may be repeated. That is, the series of processing steps may be repeated at each time when the position of the target changes. The "move" here includes not only a case where the standing position of the target itself changes (e.g., when the target walks and moves), but also a case where the position of each part of the target changes (e.g., when the position of the face changes by the target moving the face up and down), for example. Specifically, for example, the position of the target may be acquired in predetermined intervals, the capturing range of the camera 18 may be changed at each time, the illumination range of the illuminator 19 may be changed on the basis of that, and then, the image of the target may be captured.

Technical Effect

Next, a technical effect obtained by the information processing apparatus 10 according to the second example embodiment will be described.

As described in FIG. 4 and FIG. 5, in the information processing apparatus 10 according to the second example embodiment, the capturing range of the camera 18 is changed based on the target position, and the illumination range of the illuminator 19 is changed on the basis of the capturing range of the camera 18. In this way, the target may be properly illuminated with the illumination light by using a change in the capturing range of the camera 18, and it is thus possible to acquire the image of the target, more properly.

Third Example Embodiment

The information processing apparatus 10 according to a third example embodiment will be described with reference to FIG. 6 to FIG. 8. The third example embodiment is partially different from the second example embodiment only in the configuration and operation, and may be the same as the first and second example embodiments in the other parts. For this reason, a part that is different from each of the example embodiments described above will be described in detail below, and a description of the other overlapping parts will be omitted as appropriate.

Functional Configuration

First, with reference to FIG. 6, a functional configuration of the information processing apparatus 10 according to the third example embodiment will be described. FIG. 6 is a block diagram illustrating the functional configuration of the information processing apparatus according to the third example embodiment. In FIG. 6, the same components as those illustrated in FIG. 4 carry the same reference numerals.

Figure 6:
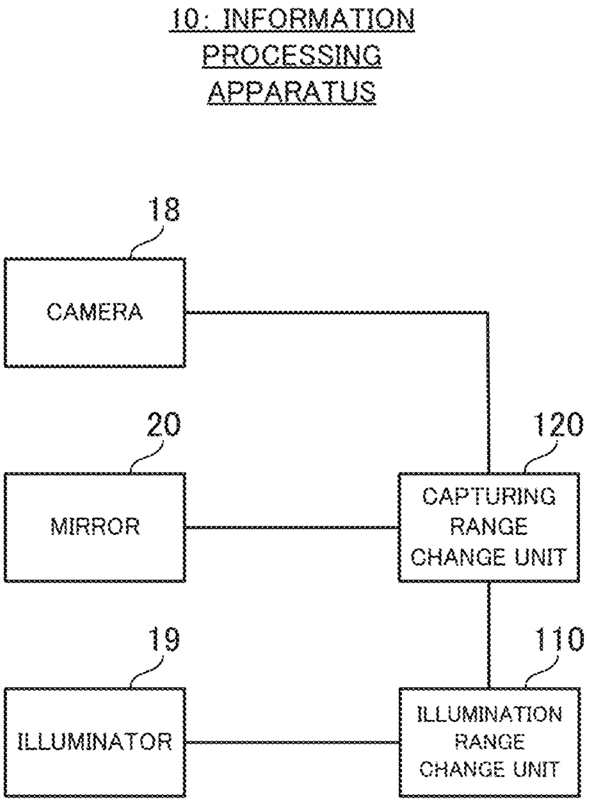
FIG. 6 is a block diagram illustrating a functional configuration of an information processing apparatus according to a third example embodiment.

As illustrated in FIG. 6, the information processing apparatus 10 according to the third example embodiment includes, as components for realizing the functions thereof, the camera 18, the illuminator 19, a mirror 20, the illumination range change unit 110, and the capturing range control unit 120. That is, the information processing apparatus 10 according to the third example embodiment further includes the mirror 20 in addition to the configuration in the second example embodiment (see FIG. 4).

The mirror 20 is disposed in the capturing range of the camera 18. For example, the mirror 20 may be disposed about several cm to several tens of cm away from a lens of the camera 18. Furthermore, the mirror 20 is configured to change an angle thereof with respect to the camera 18. For example, the mirror 20 is configured to be rotationally driven. In the present example embodiment, the capturing range of the camera 18 is changed by changing an angle of the mirror 20. Therefore, in the present example embodiment, the camera 18 itself may not be movable. The angle of the mirror 20 is configured to be controlled by the capturing range change unit 120.

Change in Capturing Range by Mirror

Next, the change in the capturing range of the camera 18 by the mirror 20 described above will be described with reference to FIG. 7. FIG. 7 is a side view illustrating an capturing example using the mirror in the information processing apparatus according to the third example embodiment.

Figure 7:
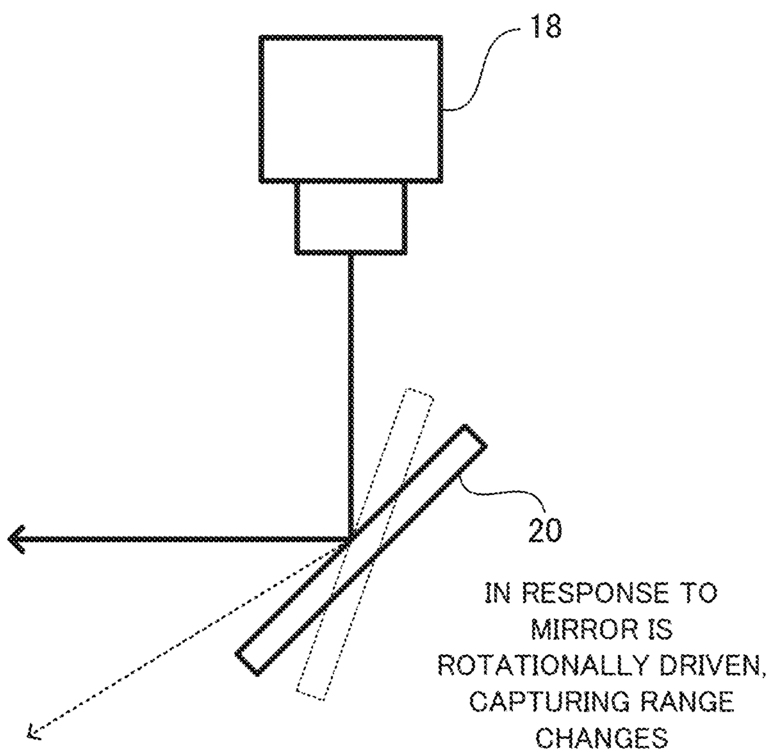
FIG. 7 is a side view illustrating an capturing example using a mirror in the information processing apparatus according to the third example embodiment.

As illustrated in FIG. 7, in the information processing apparatus 10 according to the third example embodiment, the camera 18 is disposed to face directly downward. Then, the mirror 20 is disposed below the camera 18. Therefore, the camera 18 captures a front surface through the mirror 20. The mirror 20 is configured to be rotationally driven. The angle of the mirror 20 may be controlled by an actuator or the like, for example. When the mirror 20 is rotationally driven and the angle is changed, the capturing range of the camera 18 changes accordingly. For example, in the example illustrated in the drawing, a height of the capturing range is changed based on the angle of the mirror. The arrangement of the camera 18 and the mirror 20, however, is not limited to such an example, and the capturing range of the camera 18 may be changed in a lateral direction by driving the mirror 20, for example.

Capturing Operation

First, with reference to FIG. 8, a flow of the capturing operation by the information processing apparatus 10 according to the third example embodiment will be described. FIG. 8 is a flowchart illustrating the flow of the capturing operation by the information processing apparatus according to the third example embodiment. In FIG. 8, the same steps as those illustrated in FIG. 5 carry the same reference numerals.

Figure 8:
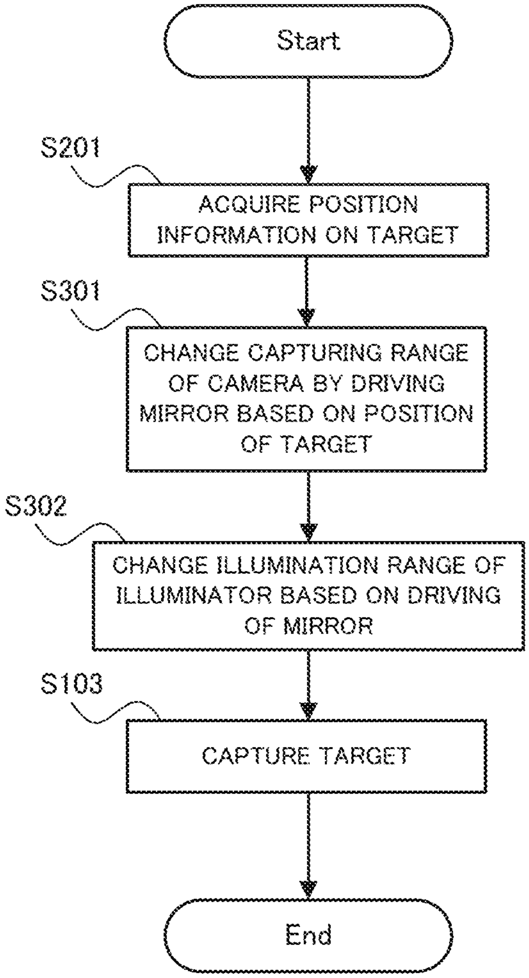
FIG. 8 is a flowchart illustrating a flow of the capturing operation by the information processing apparatus according to the third example embodiment.

As illustrated in FIG. 8, when the capturing operation by the information processing apparatus 10 according to the third example embodiment is started, first, the capturing range change unit 120 acquires the position of the target (step S201). The capturing range change unit 120 changes the capturing range of the camera 18 by driving the mirror 20 based on the position of the target (step S301).

Subsequently, the illumination range change unit 110 changes the illumination range of the illuminator 19 on the basis of the driving of the mirror 20 (step S302). For example, the illumination range change unit 110 may change the illumination range of the illuminator 19 in the same direction as a direction of changing the capturing range of the camera 18 by driving the mirror 20. Furthermore, the illumination range change unit 110 may change the illumination range of the illuminator 19 on the basis of a driving amount of the mirror 20 (e.g., an angle at which the mirror 20 is rotated). The camera 18 then captures the image of the target (step S103).

Technical Effect

Next, a technical effect obtained by the information processing apparatus 10 according to the third example embodiment will be described.

As described in FIG. 6 to FIG. 8, in the information processing apparatus 10 according to the third example embodiment, the capturing range of the camera 18 is changed by driving the mirror 20, and the illumination range of the illuminator 19 is changed on the basis of the driving of the mirror 20. In this way, the target may be properly illuminated with the illumination light by using a change in the capturing range of the camera 18, and it is thus possible to acquire the image of the target, more properly. The capturing range of the camera 18 is also changed by driving the mirror 20, but the illumination range is changed on the basis of the capturing range after the change, and it is thus possible to acquire a target image, more properly.

Fourth Example Embodiment

The information processing apparatus 10 according to a fourth example embodiment will be described with reference to FIG. 9, FIG. 10A and FIG. 10B. The fourth example embodiment is partially different from the third example embodiment only in the configuration and operation, and may be the same as the first to third example embodiments in the other parts. For this reason, a part that is different from each of the example embodiments described above will be described in detail below, and a description of the other overlapping parts will be omitted as appropriate.

Configuration of Mirror

Figure 9:
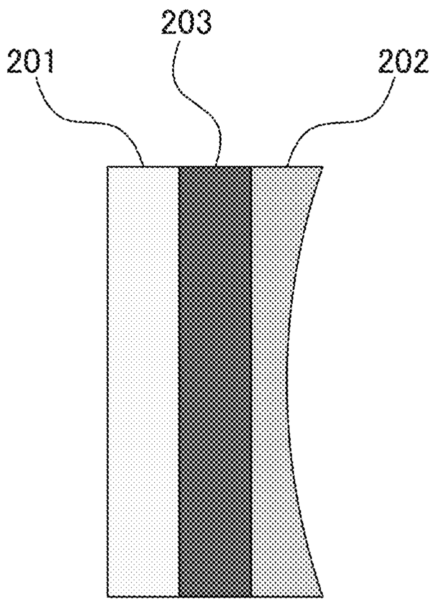
FIG. 9 is a side view illustrating a configuration of the mirror in an information processing apparatus according to a fourth example embodiment.

First, with reference to FIG. 9, a configuration of the mirror 20 provided in the information processing apparatus 10 according to the fourth example embodiment specifically described. FIG. 9 is a side view illustrating the configuration of the mirror in an information processing apparatus according to the fourth example embodiment.

As illustrated in FIG. 9, the mirror 20 according to the fourth example embodiment includes a plane mirror 201, a concave mirror 202, and a central member 203. The mirror 20 is configured to be rotatable, for example, and a surface with respect to the camera 18 is changed by the rotation. when the plane mirror 201 faces to the camera 18, the camera 18 captures the image of the target through the plane mirror 201. On the other hand, when the mirror 20 is half-rotated, the concave mirror 202 faces to the camera 18. In this instance, the camera 18 captures the image of the target through the concave mirror 202. Thus, by using the mirror 20 according to the fourth example embodiment, it is possible to perform the capturing by properly switching the plane mirror 201 and the concave mirror 202.

Capturing Corresponding to Distance

Next, with reference to FIG. 10A and FIG. 10B, the capturing operation corresponding to a distance to the target by the information processing apparatus 10 according to the fourth example embodiment will be described. FIG. 10A and FIG. 10B are side view illustrating an capturing example corresponding to the distance in the information processing apparatus according to the fourth example embodiment.

Figure 10A:
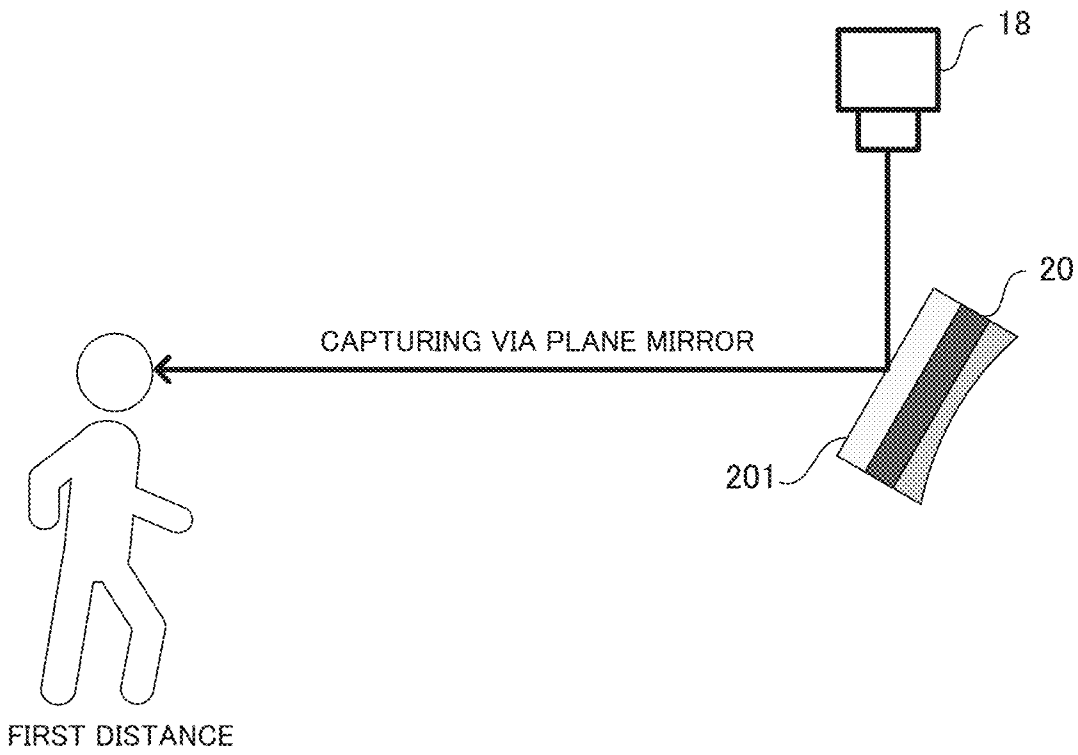
FIG. 10A is a side view illustrating an capturing example corresponding to a distance in the information processing apparatus according to the fourth example embodiment.
Figure 10B:
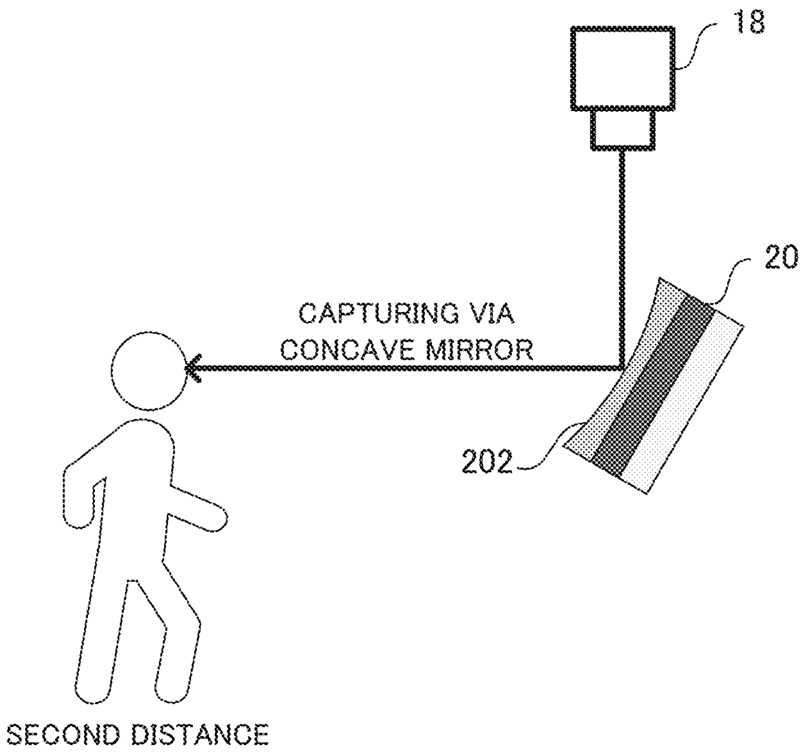
FIG. 10B is a side view illustrating an capturing example corresponding to a distance in the information processing apparatus according to the fourth example embodiment.

As illustrated in FIG. 10A and FIG. 10B, in the information processing apparatus 10 according to the fourth example embodiment, the mirror 20 is rotationally driven based on the distance to the target. Specifically, as illustrated in FIG. 10A, when the distance to the target is a first distance (e.g., 1.8 m), the mirror 20 is rotationally driven such that the plane mirror 201 is on a side of the camera 18. Therefore, when the distance to the target is the first distance, the camera 18 captures the image of the target through the plane mirror 201. On the other hand, as illustrated in FIG. 10B, when the distance to the target is a second distance (e.g., 1.0 m) that is closer than the first distance, the mirror 20 is rotationally driven such that the concave mirror 202 is on the side of the camera 18. Therefore, when the distance to the target is the second distance, the camera 18 captures the image of the target through the concave mirror 202.

Technical Effect

Next, a technical effect obtained by the information processing apparatus 10 according to the fourth example embodiment will be described.

As described in FIG. 9, FIG. 10A and FIG. 10B, in the information processing apparatus according to the fourth example embodiment, the mirror 20 includes the plane mirror 201 and the concave mirror 202, and the capturing is performed through the plane mirror 201 or the concave mirror 202 based on the distance to the target. In this way, even when the distance to the target varies in the capturing, the capturing may be properly performed based on the distance. Furthermore, even when a moving target is captured (e.g., a target approaching the camera 18), it is possible to an appropriate image of the target. Such a technical effect is prominently exhibited when a focal length of the camera 18 cannot be changed, for example. Specifically, even when the focal length of the camera 18 cannot be changed, it is possible to capture the targets at different positions by allowing the concave mirror 202 to have a magnification effect. For example, it is possible to capture the target located at a relatively far distance through the plane mirror 201, and the target located at a relatively close distance through the concave mirror 202.

Fifth Example Embodiment

The information processing apparatus 10 according to a fifth example embodiment will be described with reference to FIG. 11 and FIG. 12. The fifth example embodiment is partially different from the third example embodiment only in the configuration and operation, and may be the same as the first to fourth example embodiments in the other parts. For this reason, a part that is different from each of the example embodiments described above will be described in detail below, and a description of the other overlapping parts will be omitted as appropriate.

Functional Configuration

First, with reference to FIG. 11, a functional configuration of the information processing apparatus 10 according to the fifth example embodiment will be described. FIG. 11 is a block diagram illustrating the functional configuration of the information processing apparatus according to the fifth example embodiment. In FIG. 11, the same components as those illustrated in FIG. 6 carry the same reference numerals.

Figure 11:
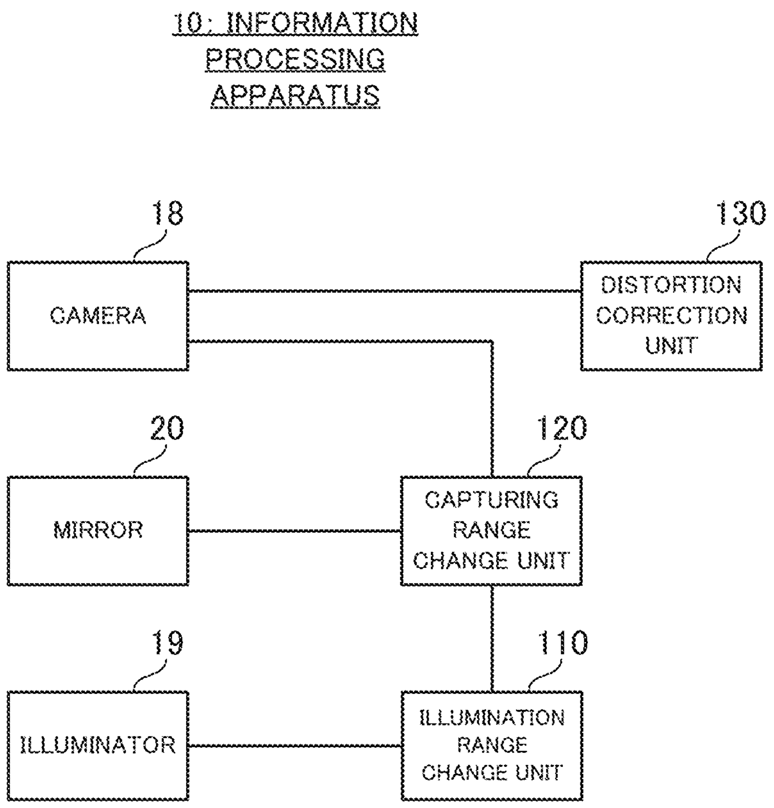
FIG. 11 is a block diagram illustrating a functional configuration of an information processing apparatus according to a fifth example embodiment.

As illustrated in FIG. 11, the information processing apparatus 10 according to the fifth example embodiment includes, as components for realizing the functions thereof, the camera 18, the illuminator 19, the mirror 20, the illumination range change unit 110, the capturing range control unit 120, and a distortion correction unit 130. That is, the information processing apparatus 10 according to the fifth example embodiment further includes the distortion correction unit 130 in addition to the configuration in the third example embodiment (see FIG. 6). The distortion correction unit 130 may be a processing block realized or implemented by the processor 11 (see FIG. 1), for example.

The distortion correction unit 130 is configured to perform processing for correcting a distortion on the image captured through the concave mirror 202. Here, the "distortion" is a distortion caused by performing the capturing through the concave mirror 202. The processing for correcting the distortion is not particularly limited, and the existing techniques/technologies may be properly adopted.

Image Output Operation

Next, with reference to FIG. 12, a flow of an image output operation (i.e., an operation when the image is captured and outputted) by the information processing apparatus 10 according to the fifth example embodiment will be described. FIG. 12 is a flowchart illustrating the flow of the image output operation by the information processing apparatus according to the fifth example embodiment. The following describes the operation when the target approaching the camera 18 is captured.

Figure 12:
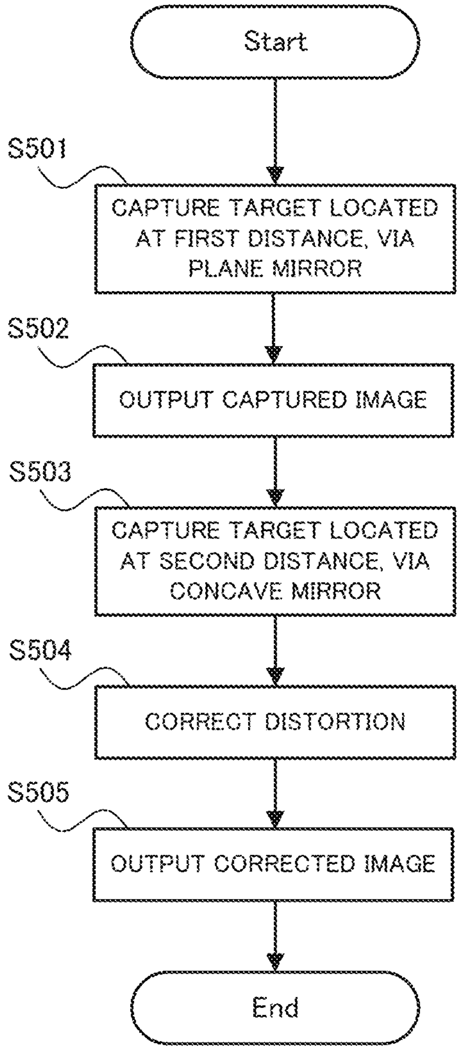
FIG. 12 is a flowchart illustrating a flow of an image output operation by the information processing apparatus according to the fifth example embodiment.

As illustrated in FIG. 12, when the image output operation by the information processing apparatus 10 according to the fifth example embodiment is started, first, the camera 18 captures the target located at a first distance, through the plane mirror 201 (step S501). Then, the camera 18 outputs the image of the target captured through the plane mirror 201 (step S502).

Subsequently, the camera 18 captures the target located at a second distance, through the concave mirror 202 (step S503). In particular, the distortion correction unit 130 performs the processing for correcting the distortion, on the image of the target captured through the concave mirror 202 (step S504). Whether or not the capturing is performed through the concave mirror 202 may be determined on the basis of the distance to the target. For example, when the target located at the second distance is captured, it may be determined that the capturing is performed through the concave mirror 202 and the distortion correction unit 130 may perform the processing for correcting the distortion. Alternatively, whether or not the capturing is performed through the concave mirror 202 may be determined on the basis of a rotation angle of a motor that rotates the mirror 20. For example, when the rotational angle of the motor changes by about 180 degrees (i.e., when driving for inverting the mirror 20 is performed in order to switch from the plane mirror 201 to the concave mirror 202), it may be determined that the capturing is performed through the concave mirror 202, and the distortion correction unit 130 may perform the processing for correcting the distortion. Thereafter, the distortion correction unit 130 outputs a corrected image on which the distortion correction is performed (step S505).

Technical Effect

Next, a technical effect obtained by the information processing apparatus 10 according to the fifth example embodiment will be described.

As described in FIG. 11 and FIG. 12, in the information processing apparatus 10 according to the fifth example embodiment, the distortion correction processing is performed on the image captured through the concave mirror 202. In this way, since the distortion caused by the concave mirror 202 is corrected, it is possible to acquire a more appropriate image of the target.

Sixth Example Embodiment

The information processing apparatus 10 according to a sixth example embodiment will be described with reference to FIG. 13. The sixth example embodiment is partially different from the third example embodiment only in the configuration and operation, and may be the same as the first to fifth example embodiments in the other parts. For this reason, a part that is different from each of the example embodiments described above will be described in detail below, and a description of the other overlapping parts will be omitted as appropriate.

Functional Configuration

First, with reference to FIG. 13, a functional configuration of the information processing apparatus 10 according to the sixth example embodiment will be described. FIG. 13 is a block diagram illustrating the functional configuration of the information processing apparatus according to the sixth example embodiment. In FIG. 13, the same components as those illustrated in FIG. 6 carry the same reference numerals.

Figure 13:
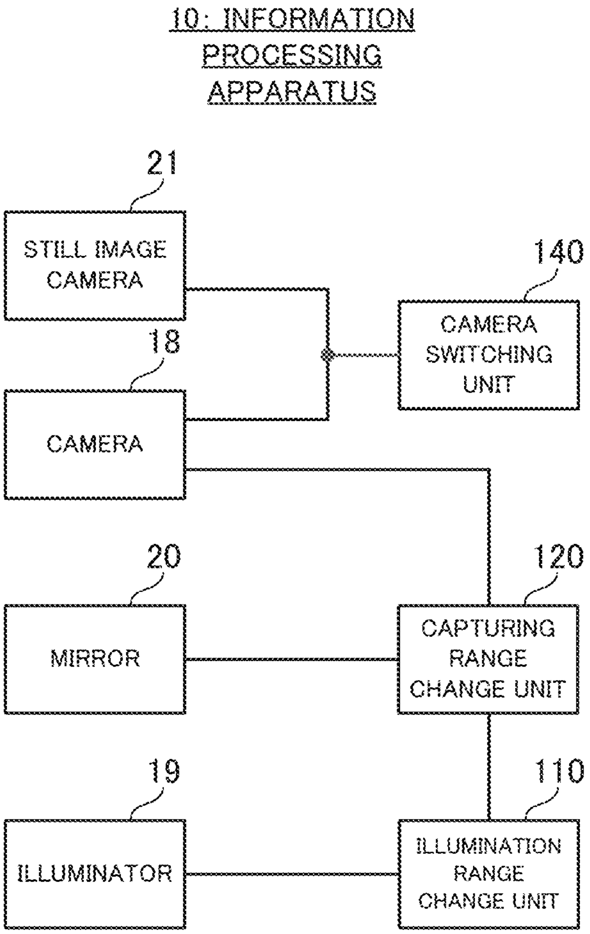
FIG. 13 is a block diagram illustrating a functional configuration of an information processing apparatus according to a sixth example embodiment.

As illustrated in FIG. 13, the information processing apparatus 10 according to the sixth example embodiment includes, as components for realizing the functions thereof, the camera 18, the illuminator 19, the mirror 20, a still image camera 21, the illumination range change unit 110, the capturing range control unit 120, and a camera switching unit 140. That is, the information processing apparatus 10 according to the sixth example embodiment further includes the still image camera 21 and the camera switching unit 140 in addition to the configuration in the third example embodiment (see FIG. 6). The camera switching unit 140 may be a processing block realized or implemented by the processor 11 (see FIG. 1), for example.

The still image camera 21 is provided as a different camera from the camera 18 described in each of the example embodiments described above. The camera 18 according to the present example embodiment is provided as a camera that captures a moving target. On the other hand, the still image camera 21 is provided as a camera that captures a stopped target. The still image camera 21 may be the same type of the camera as the camera 18, or may be another type of the camera. Furthermore, a plurality of still image cameras 21 may be provided. For example, a still image camera 21 for capturing the face of the target and a still image camera 21 for capturing the iris of the target may be provided. An arrangement position of the still image camera 21 is not particularly limited. The still image camera 21 may be disposed below the camera 18 and the illuminator 19. Alternatively, the still image camera 21 may be disposed above the camera 18 and the illuminator 19. Alternatively, the still image camera 21 may be disposed at the same height as that of the camera 18 and the illuminator 19. Furthermore, apart from the illuminator 19, a dedicated illuminator used when the still image camera 21 performs the capturing, may be provided. The illumination range may not be changeable for this illuminator.

The camera switching unit 140 is configured to switch whether the image of the target is captured by the camera 18 or the still image camera 21. The camera switching unit 140 may switch between the camera 18 and the still image camera 21 based on the position of the target, for example. A specific example of a switching condition by the camera switching unit 140 will be described in detail in another example embodiment later. The camera switching unit 140 may output guidance information to stop the target when the image of the target is captured by the still image camera 21. For example, a message or an image such as "Please stop" may be displayed on a display or the like. Alternatively, the same/similar message may be audio-outputted by a speaker or the like.

Technical Effect

Next, a technical effect obtained by the information processing apparatus 10 according to the sixth example embodiment will be described.

As described in FIG. 13, in the information processing apparatus 10 according to the sixth example embodiment, apart from the camera 18 that captures the moving target, the still image camera 21 that captures the stopped target is provided. With this configuration, even when the camera 18 is not capable of acquiring an appropriate image of the target, it is possible to acquire an appropriate image of the target by using the still image camera 21.

Seventh Example Embodiment

The information processing apparatus 10 according to a seventh example embodiment will be described with reference to FIG. 14 and FIG. 15. The seventh example embodiment is partially different from the sixth example embodiment only in the configuration and operation, and may be the same as the first to sixth example embodiments in the other parts. For this reason, a part that is different from each of the example embodiments described above will be described in detail below, and a description of the other overlapping parts will be omitted as appropriate.

Functional Configuration

First, with reference to FIG. 14, a functional configuration of the information processing apparatus 10 according to the sixth example embodiment will be described. FIG. 14 is a block diagram illustrating the functional configuration of the information processing apparatus according to the seventh example embodiment. In FIG. 14, the same components as those illustrated in FIG. 13 carry the same reference numerals.

Figure 14:
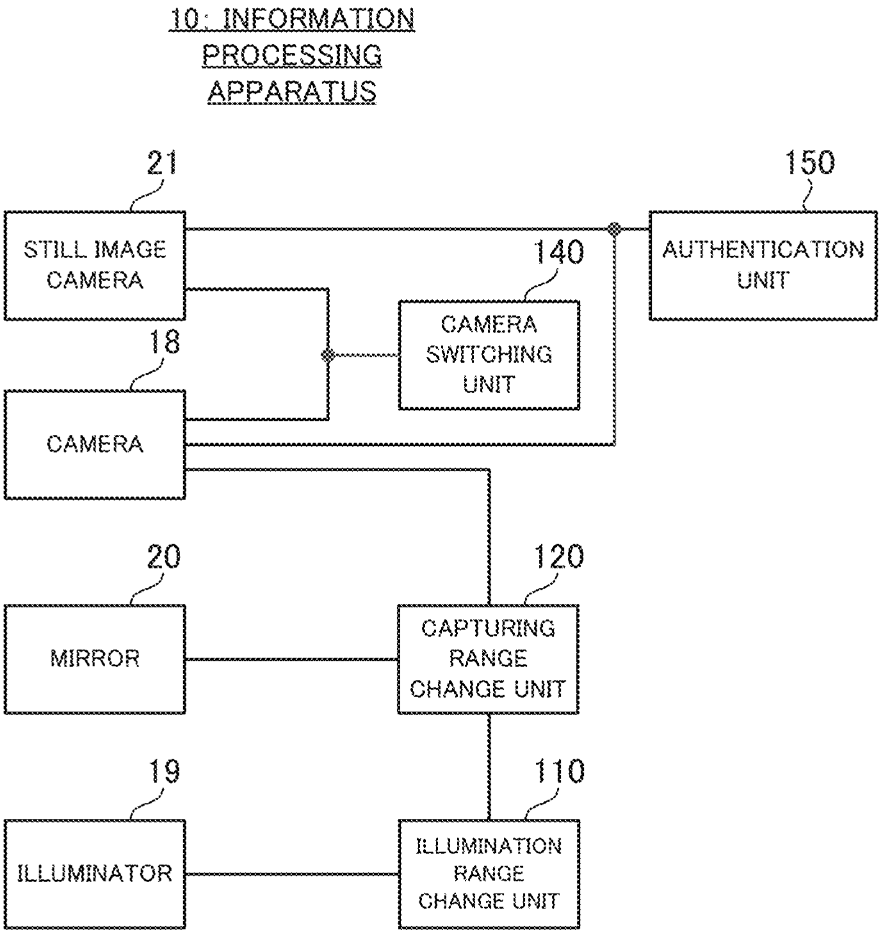
FIG. 14 is a block diagram illustrating a functional configuration of an information processing apparatus according to a seventh example embodiment.

As illustrated in FIG. 14, the information processing apparatus 10 according to the seventh example embodiment includes, as components for realizing the functions thereof, the camera 18, the illuminator 19, the mirror 20, the still image camera 21, the illumination range change unit 110, the capturing range control unit 120, the camera switching unit 140, and an authentication unit 150. That is, the information processing apparatus 10 according to the seventh example embodiment further includes the authentication unit 150 in addition to the configuration in the sixth example embodiment (see FIG. 13). The authentication unit 150 may be a processing block realized or implemented by the processor 11 (see FIG. 1), for example.

The authentication unit 150 is configured to perform authentication processing by using the image of the target captured by the camera 18 or the still image camera 21. For example, the authentication unit 150 may be configured to perform face authentication processing by using the face image of the target. Alternatively, the authentication unit 150 may be configured to perform iris authentication processing by using the iris image of the target. Alternatively, the authentication unit 150 may be configured to perform multimodal authentication processing by using the face image and the iris image of the target. For example, the authentication unit 150 may collate/verify a registration image registered in advance with the image of the target captured by the camera 18 or the still image camera 21, and may calculate a matching score indicating a matching degree thereof. In this case, the authentication unit 150 may determine that the authentication is successful when the matching score is greater than a predetermined threshold, and may determine that the authentication is failed when the matching score is less than the predetermined threshold.

Authentication Operation

Next, with reference to FIG. 15, a flow of an authentication operation (i.e., an operation when the image is captured and the authentication processing is performed) by the information processing apparatus 10 according to the seventh example embodiment will be described. FIG. 15 is a flowchart illustrating the flow of the authentication operation by the information processing apparatus according to the seventh example embodiment.

Figure 15:
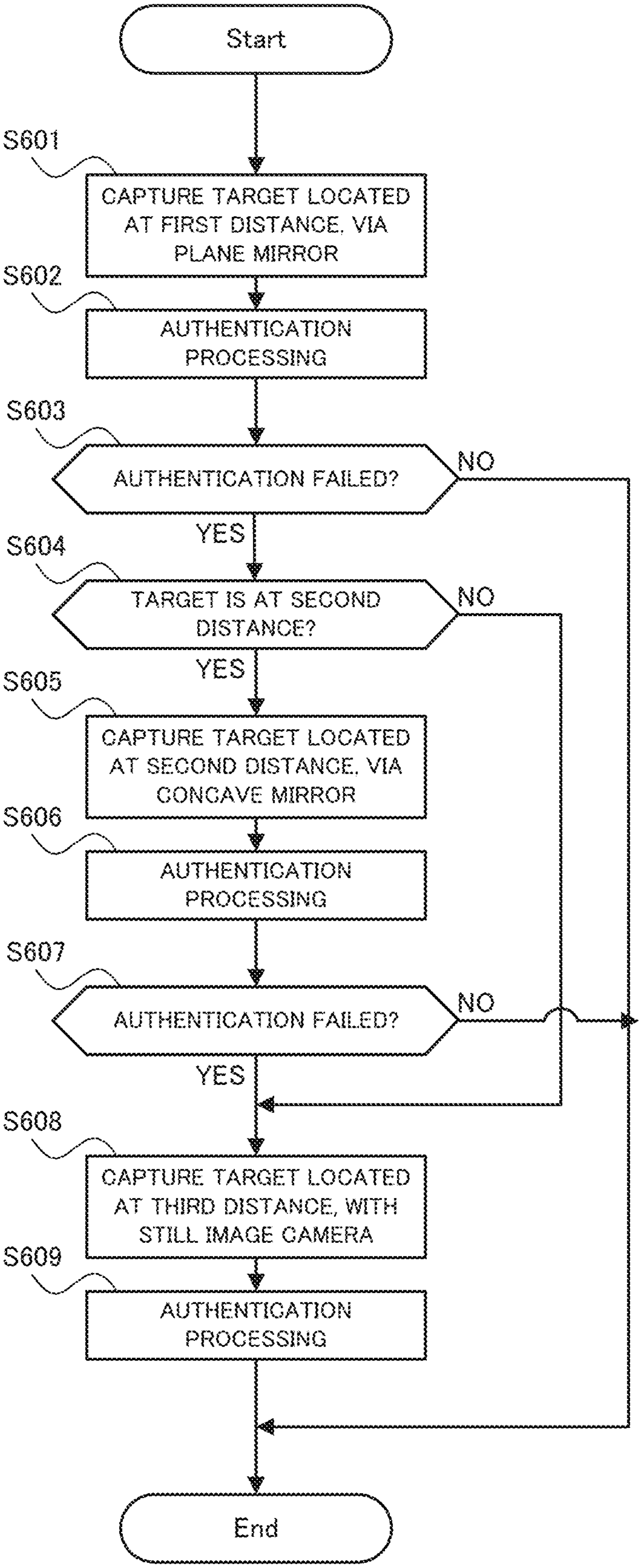
FIG. 15 is a flowchart illustrating a flow of an authentication operation by the information processing apparatus according to the seventh example embodiment.

As illustrated in FIG. 15, when the authentication operation by the information processing apparatus 10 according to the seventh example embodiment is started, first, the camera 18 captures the target located at the first distance, through the plane mirror 201 (step S601). Then, the authentication unit 150 performs the authentication processing by using the image of the target captured through the plane mirror 201 (step S602). When the authentication processing is successful (step S603: NO), the subsequent processing may be omitted and a series of processing steps may be ended.

On the other hand, when the authentication processing is failed (the step S603: YES), the camera switching unit 140 determines whether or not the target is currently at the second distance (step S604). Then, when the target is at the second distance (the step S604: YES), the camera 18 captures the target located at the second distance, through the concave mirror 202 (step S605). Then, the authentication unit 150 performs the authentication processing by using the image of the target captured through the concave mirror 202 (step S606). When the authentication processing is successful (step S607: NO), the subsequent processing may be omitted and a series of processing steps may be terminated.

On the other hand, when the position of the target is not at the second distance (the step S604: NO), the steps S605 and S606 (i.e., the capturing of the target through the concave mirror 202 and the authentication processing using the image) are omitted, and the still image camera 21 captures the target located at a third distance (e.g., 0.5 m) that is shorter than the second distance (step S608). The authentication unit 150 then performs the authentication processing by using the image of the target captured by the still image camera 21 (step S609). Even when the authentication processing using the image captured through the concave mirror 202 is failed (the step S607: YES), the still image camera 21 captures the target located at the third distance (step S608). The authentication unit 150 then performs the authentication processing by using the image of the target captured by the still image camera 21 (step S609).

The authentication processing using the image captured by the still image camera 21 may be repeated when the authentication processing is failed. At this time, for example, the guidance information may be outputted to the target so as to capture an appropriate image. For example, a message such as “Please turn your face to the camera” or “Please open your eyes wide” may be outputted. When the authentication processing using the image captured by the still image camera 21 is failed many times, information indicating a failure in the authentication processing, may be outputted.

Technical Effect

Next, a technical effect obtained by the information processing apparatus 10 according to the seventh example embodiment will be described.

As described in FIG. 14 and FIG. 15, in the information processing apparatus 10 according to the seventh example embodiment, in a case where the authentication by the image captured at the first distance is failed, the capturing is performed through the concave mirror 202 when the target is at the second distance, and the capturing is performed by the still image camera 21 when the target is at the third distance. In this way, it is possible to acquire the image of the target in an appropriate way, based on the position of the target when the authentication is failed. Therefore, it is possible to perform the authentication processing, more properly.

Eighth Example Embodiment

The information processing apparatus 10 according to an eighth example embodiment will be described with reference to FIG. 16 and FIG. 17. The eighth example embodiment describes a specific method of changing the illumination range in each of the example embodiments described above, and may be the same as the first to seventh example embodiments in the configuration and the flow of the operation. For this reason, a part that is different from each of the example embodiments described above will be described in detail below, and a description of the other overlapping parts will be omitted as appropriate.

Driving by Belt

First, with reference to FIG. 16, a driving configuration of the information processing apparatus 10 according to the eighth example embodiment will be described. FIG. 16 is version 1 of a side view illustrating the driving configuration of the information processing apparatus according to the eighth example embodiment.

Figure 16:
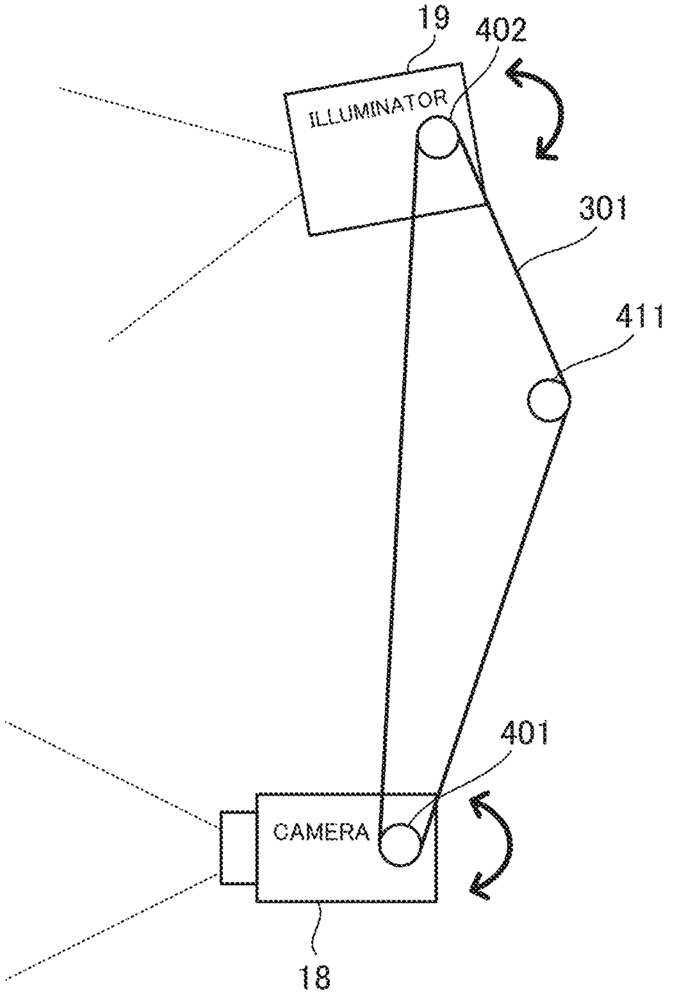
FIG. 16 is version 1 of a side view illustrating a driving configuration of an information processing apparatus according to an eighth example embodiment.

As illustrated in FIG. 16, in the information processing apparatus 10 according to the eighth example embodiment, a belt 301 is disposed to connect the camera 18 with the illuminator 19. More specifically, the belt 301 is disposed to connect a coupling member 401 of the camera 18 with a coupling member 402 of the illuminator 19. Furthermore, an idler 411 for adjusting tension of the belt 301 is provided between the camera 18 and the illuminator 19. The belt 301 is configured to transmit a driving force for changing the angle of the camera 18 (i.e., the capturing range) to the illuminator 19. Therefore, when the camera 18 is driven, the illuminator 19 is also driven in the same manner. For example, when the camera 18 is driven to face upward, the illuminator 19 is also driven to face upward. Similarly, when the camera 18 is driven to face downward, the illuminator 19 is also driven to face downward.

Modified Example

Next, with reference to FIG. 17, a modified example of the driving configuration of the information processing apparatus 10 according to the eighth example embodiment will be described. FIG. 17 is version 2 of a side view illustrating the driving configuration of the information processing apparatus according to the eighth example embodiment.

Figure 17:
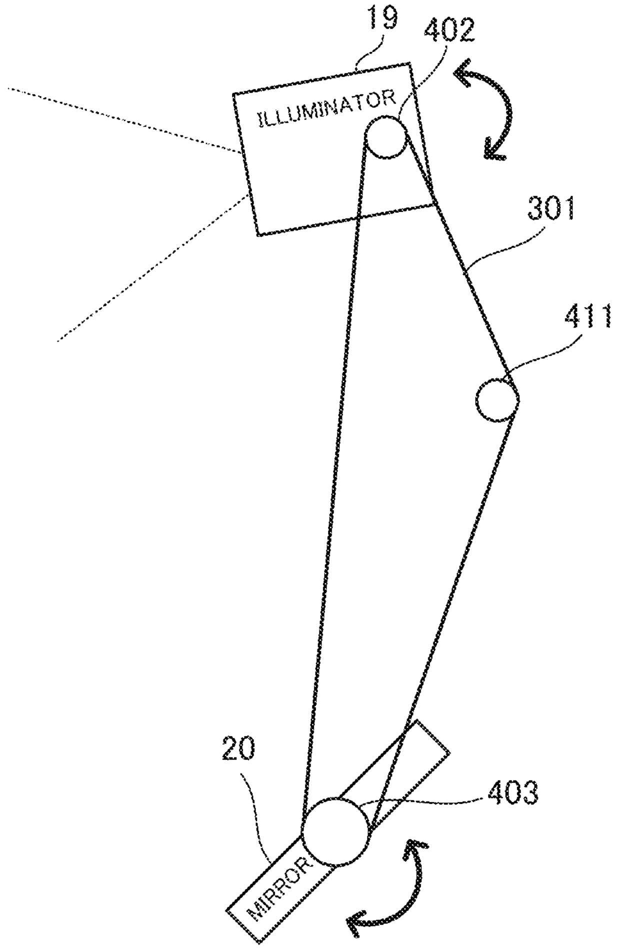
FIG. 17 is version 2 of a side view illustrating the driving configuration of the information processing apparatus according to the eighth example embodiment.

As illustrated in FIG. 17, in the information processing apparatus 10 according to the modified example of the eighth example embodiment, the belt 301 is disposed to connect the mirror 20 with the illuminator 19. More specifically, the belt 301 is disposed to connect a coupling member 403 of the mirror 20 with the coupling member 402 of the illuminator 19. Furthermore, the idler 411 for adjusting the tension of the belt 301 is provided between the camera 18 and the illuminator 19. The belt 301 is configured to transmit a driving force of a motor for changing the angle of the mirror 20 (in other words, the capturing range of the camera 18) to the illuminator 19. Therefore, when the mirror 20 is driven, the illuminator 19 is also driven in the same manner. For example, when the mirror 20 is driven to face upward, the illuminator 19 is also driven to face upward. Similarly, when the mirror 20 is driven to face downward, the illuminator 19 is also driven to face downward.

Technical Effect

Next, a technical effect obtained by the information processing apparatus 10 according to the eighth example embodiment will be described.

As described in FIG. 16 and FIG. 17, in the information processing apparatus 10 according to the eighth example embodiment, the driving force is transmitted through the belt, and the illumination range of the illuminator 19 is changed. With this configuration, it is possible to properly change the illumination range of the illuminator 19 by using the driving force for changing the capturing range of the camera 18.

Ninth Example Embodiment

The information processing apparatus 10 according to a ninth example embodiment will be described with reference to FIG. 18. As in the eighth example embodiment, the ninth example embodiment describes a specific method of changing the illumination range in each of the example embodiments described above, and may be the same as the first to eighth example embodiments in the configuration and the flow of the operation. For this reason, a part that is different from each of the example embodiments described above will be described in detail below, and a description of the other overlapping parts will be omitted as appropriate.

Driving by Gear and Rack

First, with reference to FIG. 18, a driving configuration of the information processing apparatus 10 according to the ninth example embodiment will be described. FIG. 18 is a side view illustrating the driving configuration of the information processing apparatus according to the ninth example embodiment.

Figure 18:
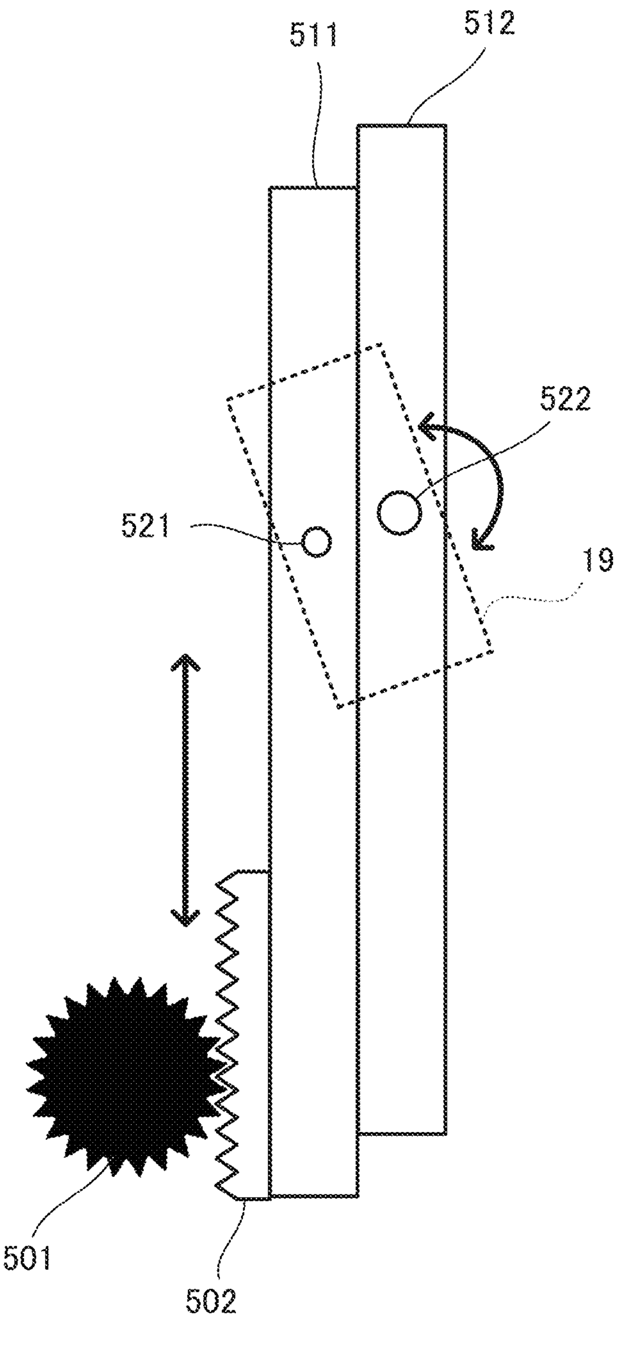
FIG. 18 is a side view illustrating a driving configuration of an information processing apparatus according to a ninth example embodiment.

As illustrated in FIG. 18, the information processing apparatus 10 according to the ninth example embodiment includes a gear 501 and a rack 502 as mechanisms for transmitting a driving force. Specifically, the gear is a member that is rotated by a driving force of a motor for changing the capturing range of the camera 18 (e.g., a driving force for moving the camera 18 itself, or a driving force for moving the mirror 20). Then, the rack 502 is a member that translates/moves in parallel in response to the rotation of the gear. The rack 502 is coupled with a first holding member 511, and when the rack 502 translates, the first holding member 511 also translates. A second holding member 512 is fixed so as not to move. Therefore, when the first holding member 511 translates, the first holding member 511 and the second holding member move so as to be shifted in parallel.

The illuminator 19 is coupled with the first holding member 511 and the second holding member 512. Specifically, the illuminator 19 is coupled with the first holding member 511 in a rotary drive pin 521. Furthermore, the illuminator 19 is coupled with the second holding member in a rotation center member 522. Therefore, when the first holding member 511 translates due to the driving of the gear 501 and the rack 502, the illuminator 19 is rotationally driven around the rotation center member. For example, when the first holding member 511 translates downward, the illuminator 19 is rotated to face downward. Conversely, when the first holding member 511 translates upward, the illuminator 19 is rotated to face upward.

Technical Effect

Next, a technical effect obtained by the information processing apparatus 10 according to the ninth example embodiment will be described.

As described in FIG. 18, in the information processing apparatus 10 according to the ninth example embodiment, the driving force is transmitted through the gear and the rack, and the illumination range of the illuminator 19 is changed. With this configuration, it is possible to properly change the illumination range of the illuminator 19 by using the driving force for changing the capturing range of the camera 18.

Tenth Example Embodiment

The information processing apparatus 10 according to a tenth example embodiment will be described with reference to FIG. 19 and FIG. 20. The tenth example embodiment is partially different from the first to ninth example embodiments only in the configuration, and may be the same as the first to ninth example embodiments in the other parts. For this reason, a part that is different from each of the example embodiments described above will be described in detail below, and a description of the other overlapping parts will be omitted as appropriate.

Functional Configuration

First, with reference to FIG. 19, a functional configuration of the information processing apparatus 10 according to the tenth example embodiment will be described. FIG. 19 is version 1 of a block diagram illustrating the functional configuration of the information processing apparatus according to the tenth example embodiment. FIG. 19 illustrates only components closely related to the present example embodiment (specifically, those relating to an operation of transmitting a driving force), and illustration of the other components described in each of the above example embodiments is omitted as appropriate.

Figure 19:
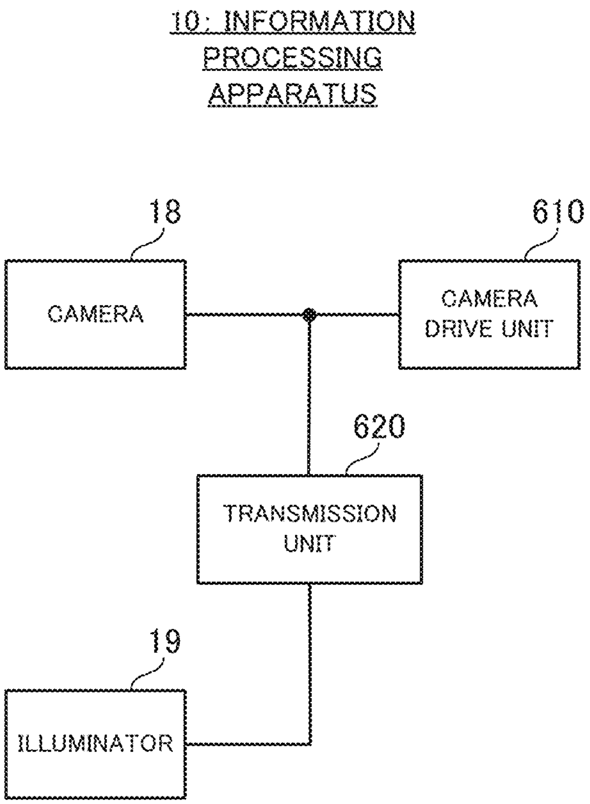
FIG. 19 is version 1 of a block diagram illustrating a functional configuration of an information processing apparatus according to a tenth example embodiment.

As illustrated in FIG. 19, the information processing apparatus 10 according to the tenth example embodiment includes, as components for realizing the functions thereof, the camera 18, the illuminator 19, a camera drive unit 610, and a transmission unit 620.

The camera drive unit 610 is configured to output a driving force for changing the capturing range of the camera 18. The camera drive unit 610 may include a motor, for example. The driving force outputted from the camera drive unit 610 is outputted not only to the camera 18, but also to the illuminator 19 through the transmission unit 620. A method of transmitting the driving force is not particularly limited, but the driving force may be transmitted through the belt 301 (see FIG. 16) as described in the eighth example embodiment, or may be transmitted through the gear 501 and the rack 502 (see FIG. 18) as described in the ninth example embodiment, for example.

The transmission unit 620 is configured to shift the driving force outputted from the camera drive unit 610 and to transmit it to the illuminator 19. The transmission unit 620 may include a transmission gear, for example. For example, the transmission unit 620 may include a transmission gear coupled with the belt 301 described in the eighth example embodiment. Alternatively, the transmission unit 620 may include a transmission gear that transmits the driving force to the gear 501 described in the ninth example embodiment.

According to the configuration described above, it is possible to transmit different driving forces to the camera 18 and the illuminator 19. That is, the driving force outputted from the camera drive unit 610 is transmitted to the camera 18 as it is, whereas the driving force that is outputted from the camera drive unit 610 and is then shifted by the transmission unit 620, is transmitted to the illuminator 19. As a result, the camera 18 and the illuminator 19 have different angles of movement from each other. For example, it is possible to significantly change the angle of the camera 18 and to slightly change the angle of the illuminator 19. Conversely, it is possible to slightly change the angle of the camera 18 and to significantly change the angle of the illuminator 19.

The above describes an example in which the transmission unit 620 is provided between the camera drive unit 610 and the illuminator 19, but the transmission unit 620 may be provided between the camera drive unit 610 and the camera 18, instead of being provided between the camera drive unit 610 and the illuminator 19. Furthermore, the transmission unit 620 may be provided both between the camera drive unit 610 and the illuminator 19, and between the camera drive unit 610 and the camera 18. That is, two transmission units 620 may be provided.

Modified Example

Next, a modified example of the functional configuration of the information processing apparatus 10 according to the tenth example embodiment will be described with reference to FIG. 20. FIG. 20 is version 2 of a block diagram illustrating the functional configuration of the information processing apparatus according to the tenth example embodiment. In FIG. 20, the same components as those illustrated in FIG. 19 carry the same reference numerals.

Figure 20:
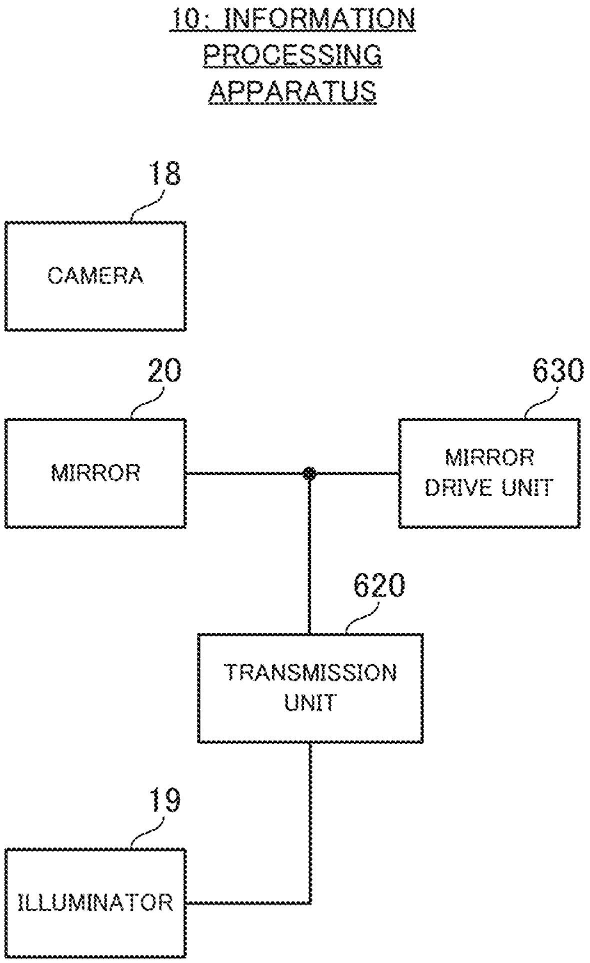
FIG. 20 is version 2 of a block diagram illustrating the functional configuration of the information processing apparatus according to the tenth example embodiment.

As illustrated in FIG. 20, the information processing apparatus 10 according to the modified example of the tenth example embodiment includes, as components for realizing the functions thereof, the camera 18, the illuminator 19, the mirror 20, a mirror drive unit 630, and the transmission unit 620. That is, in the modified example of the tenth example embodiment, the mirror 20 is provided in addition to the configuration in the tenth example embodiment (see FIG. 19), and the mirror drive unit 630 is provided in place of the camera drive unit 610.

The mirror drive unit 630 is configured to output a driving force for driving the mirror 20 (in other words, for changing the capturing range of the camera 18). The mirror drive unit 630 may include a motor, for example. The driving force outputted from the mirror drive unit 630 is outputted not only to the mirror 20, but also to the illuminator 19 through the transmission unit 620. A method of transmitting the driving force is not particularly limited, but the driving force may be transmitted through the belt 301 (see FIG. 17) as described in the eighth example embodiment, or may be transmitted through the gear 501 and the rack 502 (see FIG. 18) as described in the ninth example embodiment, for example.

According to the configuration described above, it is possible to transmit different driving forces to mirror 20 and the illuminator 19. That is, the driving force outputted from the mirror drive unit 630 is transmitted to the mirror 20 as it is, whereas the driving force that is outputted from the mirror drive unit 630 and is then shifted by the transmission unit 620, is transmitted to the illuminator 19. As a result, the mirror 20 and the illuminator 19 have different angles of movement from each other. For example, it is possible to significantly change the angle of the mirror 20 and to slightly change the angle of the illuminator 19. Conversely, it is possible to slightly change the angle of the mirror 20 and to significantly change the angle of the illuminator 19.

The above describes an example in which the transmission unit 620 is provided between the mirror drive unit 630 and the illuminator 19, but the transmission unit 620 may be provided between the mirror drive unit 630 and the mirror 20, instead of being provided between the mirror drive unit 630 and the illuminator 19. Furthermore, the transmission unit 620 may be provided both between the mirror drive unit 630 and the illuminator 19, and between the mirror drive unit 630 and the mirror 20. That is, two transmission units 620 may be provided.

Technical Effect

Next, a technical effect obtained by the information processing apparatus 10 according to the tenth example embodiment will be described.

As described in FIG. 19 and FIG. 20, in the information processing apparatus 10 according to the tenth example embodiment, the driving force for changing the capturing range of the camera 18 is shifted and transmitted to the illuminator 19. In this way, the angle at which the capturing range of the camera 18 is changed and the angle at which the illumination range of the illuminator 19 is changed, may be set different from each other, and it is thus possible to change the illumination range, more properly, depending on the circumstances.

Eleventh Example Embodiment

The information processing apparatus 10 according to an eleventh example embodiment will be described with reference to FIG. 21 to FIG. 24. The eleventh example embodiment is partially different from the first to tenth example embodiments only in the configuration, and may be the same as the first to tenth example embodiments in the other parts. For this reason, a part that is different from each of the example embodiments described above will be described in detail below, and a description of the other overlapping parts will be omitted as appropriate.

Functional Configuration

Figure 21:
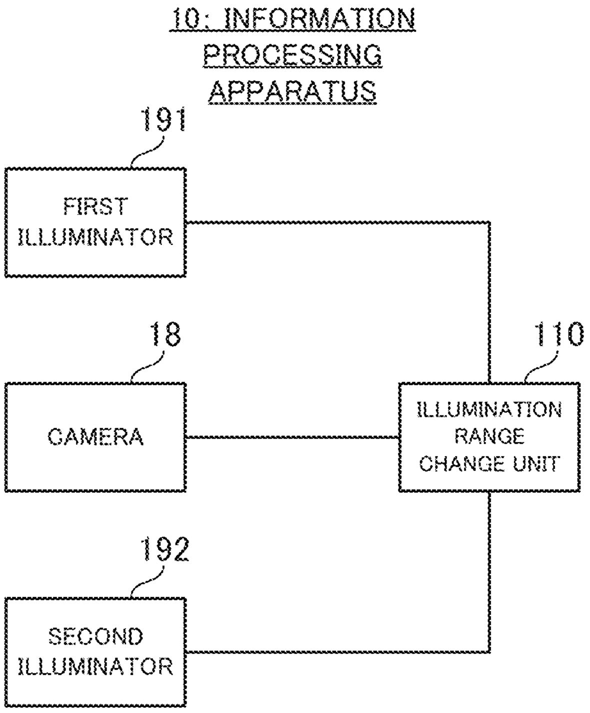
FIG. 21 is a block diagram illustrating a functional configuration of an information processing apparatus according to an eleventh example embodiment.

First, with reference to FIG. 21, a functional configuration of the information processing apparatus 10 according to the eleventh example embodiment will be described. FIG. 21 is a block diagram illustrating the functional configuration of the information processing apparatus according to the eleventh example embodiment. In FIG. 21, the same components as those illustrated in FIG. 2 carry the same reference numerals.

As illustrated in FIG. 21, the information processing apparatus 10 according to the eleventh example embodiment includes, as components for realizing the functions thereof, the camera 18, a first illuminator 191, a second illuminator 192, and the illumination range change unit 110. That is, the information processing apparatus 10 according to the eleventh example embodiment includes the first illuminator 191 and the second illuminator 192, as the illuminator 19.

The first illuminator 191 is provided on a first direction side when viewed from the camera 18. The second illuminator 192 is provided on ta second direction side when viewed from the camera 18. Therefore, the first illuminator 191 and the second illuminator 192 are provided in different directions when viewed from the camera 18. Each of the first illuminator 191 and the second illuminator 192 is configured to change the illumination range of illumination light by the illumination range control unit 110. The first illuminator 191 and second illuminator 192 may be of the same type of illuminator, or may be different types of illuminators.

Specific Arrangement Examples

Figure 22:
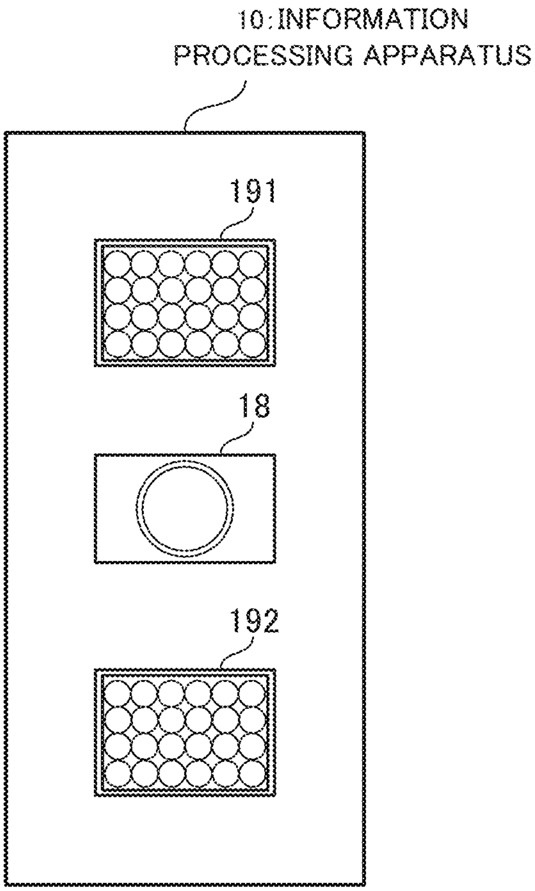
FIG. 22 is version 1 of a front view illustrating an arrangement example of each member in the information processing apparatus according to the eleventh example embodiment.
Figure 23:
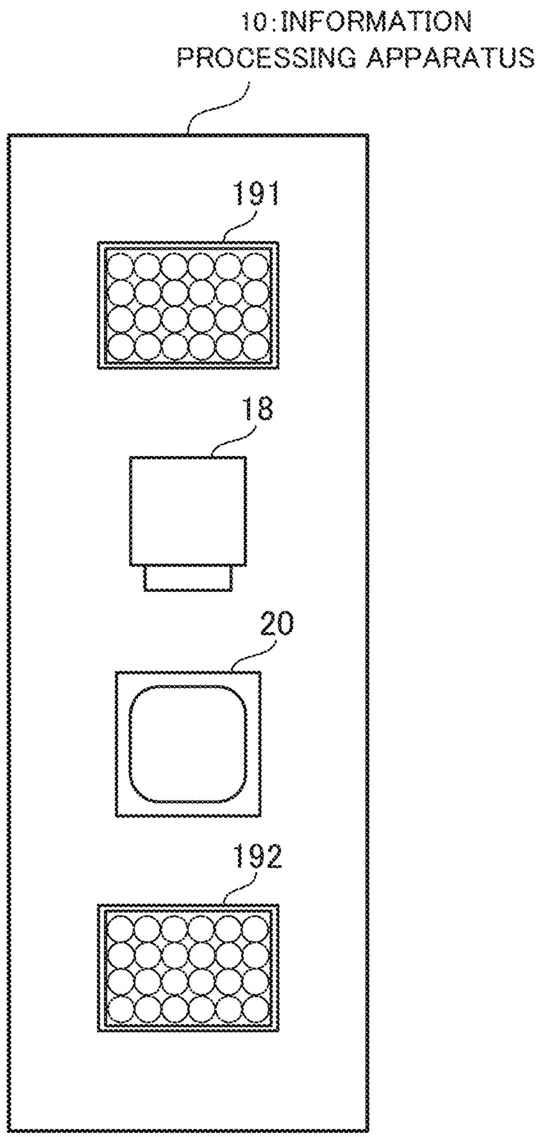
FIG. 23 is version 2 of a front view illustrating the arrangement example of each member in the information processing apparatus according to the eleventh example embodiment.

Next, specific arrangement examples of each member in the information processing apparatus 10 according to the eleventh example embodiment will be described with reference to FIG. 22 and FIG. 23. FIG. 22 is version 1 of a front view illustrating the arrangement example of each member in the information processing apparatus according to the eleventh example embodiment. FIG. 23 is version 2 of a front view illustrating the arrangement example of each member in the information processing apparatus according to the eleventh example embodiment.

As illustrated in FIG. 22, in the information processing apparatus 10 according to the eleventh example embodiment, the first illuminator 191 is disposed above the camera 18. Furthermore, the second illuminator 192 is disposed below the camera 18.

As illustrated in FIG. 23, when the information processing apparatus 10 according to the eleventh example embodiment includes the mirror 20 (specifically, when the mirror 20 is disposed below the camera 18), the first illuminator 191 may be disposed above the camera 18. Furthermore, the second illuminator 192 may be disposed below the mirror 20.

The arrangement described above is merely an example, and the first illuminator 191 and the second illuminator 192 may be arranged differently from the above arrangement. For example, the first illuminator 191 may be disposed on a left side of the camera 18 and the second illuminator 192 may be disposed on a right side of the camera 18.

Driving by Belt

Figure 24:
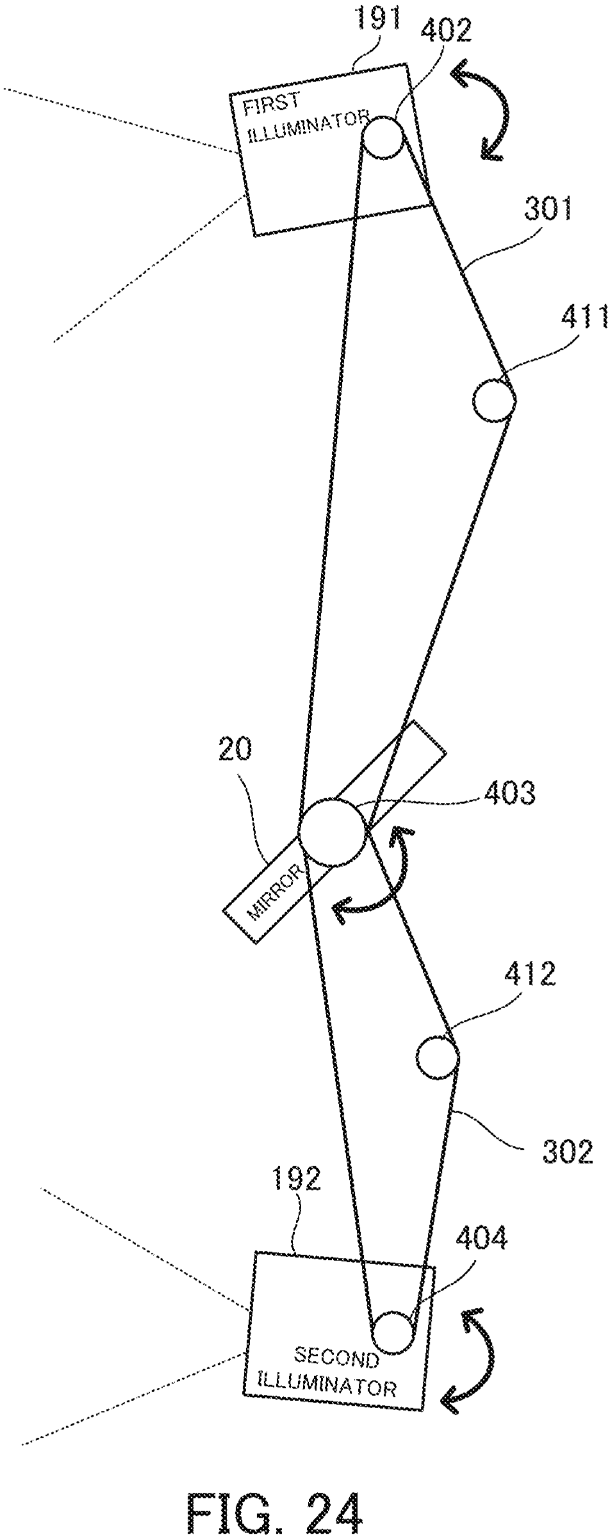
FIG. 24 is a side view illustrating a driving configuration of the information processing apparatus according to the eleventh example embodiment.

Next, with reference to FIG. 24, a driving configuration of the information processing apparatus 10 according to the eleventh example embodiment will be described. FIG. 24 is a side view illustrating the driving configuration of the information processing apparatus according to the eleventh example embodiment. In FIG. 24, the same components as those illustrated in FIG. 17 carry the same reference numerals.

As illustrated in FIG. 24, in the information processing apparatus 10 according to the eleventh example embodiment, the belt 301 is disposed to connect the mirror 20 with the first illuminator 191. More specifically, the belt 301 is disposed to connect the coupling member 403 of the mirror 20 with the coupling member 402 of the first illuminator 191. Furthermore, the idler 411 for adjusting the tension of the belt 301 is also provided between the mirror 20 and the first illuminator 191. The belt 301 is configured to transmit a driving force for changing the angle of the mirror 20 (in other words, the capturing range of the camera 18) to the first illuminator 191. Therefore, when the mirror 20 is driven, the first illuminator 191 is driven in the same manner. For example, when the mirror 20 is driven to face upward, the first illuminator 191 is also driven to face upward. Similarly, when the mirror 20 is driven to face downward, the first illuminator 191 is also driven to face downward.

In the information processing apparatus 10 according to the eleventh example embodiment, a belt 302 is further disposed to connect the mirror 20 with the second illuminator 192. More specifically, the belt 302 is disposed to connect the coupling member 403 of the mirror 20 with a coupling member 404 of the second illuminator 192. Furthermore, an idler 412 for adjusting tension of the belt 302 is also provided between the mirror 20 and the second illuminator 192. The belt 302 is configured to transmit a driving force for changing the angle of the mirror 20 (in other words, the capturing range of the camera 18) to the second illuminator 192. Therefore, when the mirror 20 is driven, the second illuminator 192 is driven in the same manner. For example, when the mirror 20 is driven to face upward, the second illuminator 192 is also driven to face upward. Similarly, when the mirror 20 is driven to face downward, the second illuminator 192 is also driven to face downward.

Technical Effect

Next, a technical effect obtained by the information processing apparatus 10 according to the eleventh example embodiment will be described.

As described in FIG. 21 to FIG. 24, in the information processing apparatus 10 according to the eleventh example embodiment, the first illuminator 191 and the second illuminator 192 are disposed in different directions when viewed from the camera 18. With this configuration, the two illuminators are arranged at different heights, and it is thus possible to apply the illumination light, more properly, based on the position of the target. It is also possible to reduce an effect/influence caused by reflection of light by glasses or the like. For example, by applying the illumination light from a different angle from that of the camera 18, it is possible to reduce the possibility that the light reflected by the glasses overlaps an iris.

Twelfth Example Embodiment

The information processing apparatus 10 according to a twelfth example embodiment will be described with reference to FIG. 25 and FIG. 26. The twelfth example embodiment is partially different from the eleventh example embodiment only in the configuration, and may be the same as the first to eleventh example embodiments in the other parts. For this reason, a part that is different from each of the example embodiments described above will be described in detail below, and a description of the other overlapping parts will be omitted as appropriate.

Functional Configuration

First, with reference to FIG. 25, a functional configuration of the information processing apparatus 10 according to the twelfth example embodiment will be described. FIG. 25 is version 1 of a block diagram illustrating the functional configuration of the information processing apparatus according to the twelfth example embodiment. FIG. 25 illustrates only components closely related to the present example embodiment (specifically, those relating to an operation of transmitting a driving force), and illustration of the other components described in each of the above example embodiments is omitted as appropriate.

Figure 25:
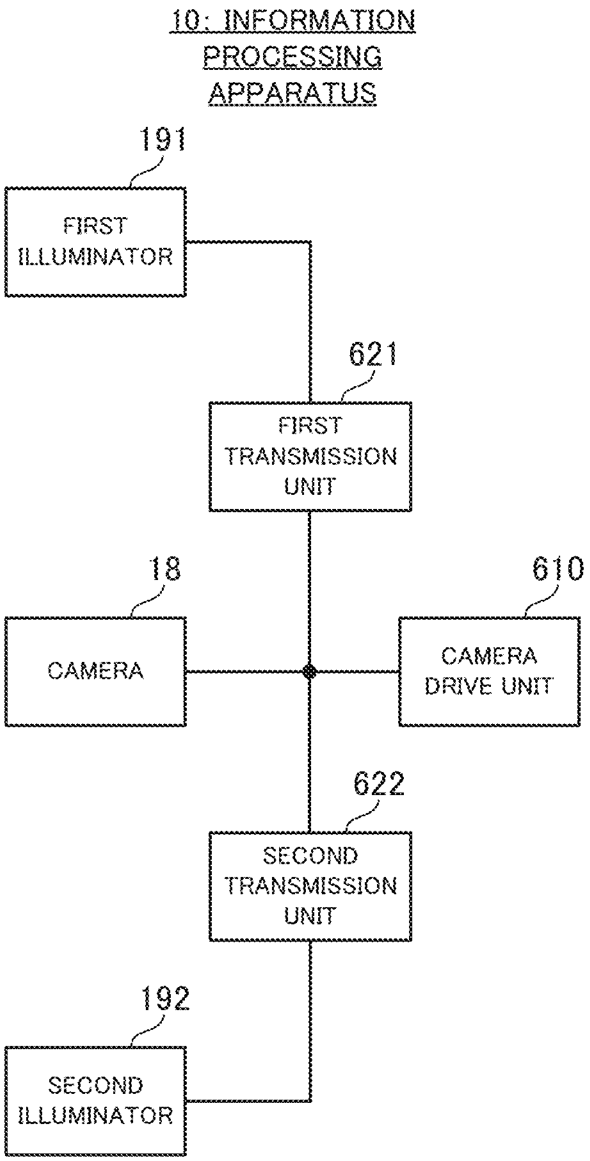
FIG. 25 is version 1 of a block diagram illustrating a functional configuration of an information processing apparatus according to a twelfth example embodiment.

As illustrated in FIG. 25, the information processing apparatus 10 according to the twelfth example embodiment includes, as components for realizing the functions thereof, the camera 18, the first illuminator 191, the second illuminator 192, the camera drive unit 610, a first transmission unit 621, and a second transmission unit 622. That is, in the twelfth example embodiment, one transmission unit 620 described in the tenth example embodiment (see FIG. 19 and FIG. 20) is provided for each of the first illuminator 191 and the second illuminator 192.

The first transmission unit 621 is configured to shift the driving force outputted from the camera drive unit 610 and to transmit it to the first illuminator 191. The second transmission unit 622 is configured to shift the driving force outputted from the camera drive unit 610 and to transmit it to the second illuminator 192. The first transmission unit 621 and the second transmission unit 622 may include a transmission gear, for example.

According to the configuration described above, it is possible to transmit different driving forces to the camera 18, the first illuminator 191, and the second illuminator 192. That is, the driving force outputted from the camera drive unit 610 is transmitted to the camera 18 as it is, whereas the driving force that is outputted from the camera drive unit 610 and is then shifted by the first transmission unit 621, is transmitted to the first illuminator 191, and the driving force that is outputted from the camera drive unit 610 and is then shifted by the second transmission unit 622, is transmitted to the second illuminator 192. As a result, the camera 18, the first illuminator 191, the second illuminator 192 have different angles of movement from each other. Especially in the present example embodiment, the first illuminator 191 and the second illuminator 192 may be set to have different angles of movement. For example, it is possible to significantly change the angle of the first illuminator 191 and to slightly change the angle of the second illuminator 192. Conversely, it is possible to slightly change the angle of the first illuminator 191 and to significantly change the angle of the second illuminator 192.

Modified Example

Next, with reference to FIG. 26, a modified example of the functional configuration of the information processing apparatus 10 according to the twelfth example embodiment will be described. FIG. 26 is version 2 of a block diagram illustrating the functional configuration of the information processing apparatus according to the twelfth example embodiment. In FIG. 26, the same components as those illustrated in FIG. 25 carry the same reference numerals.

Figure 26:
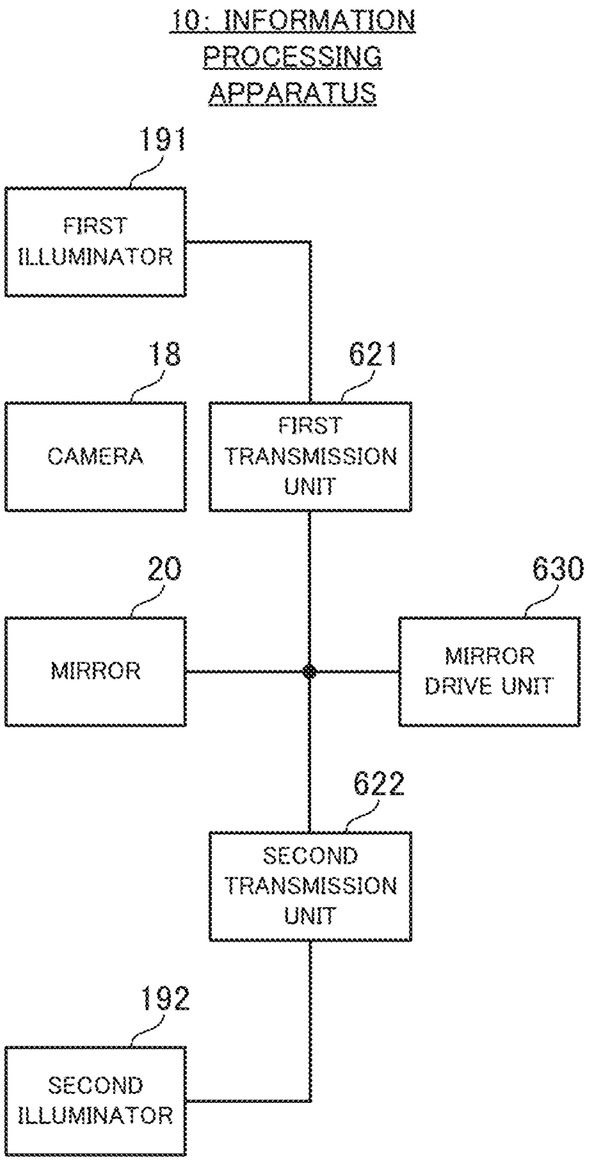
FIG. 26 is version 2 of a block diagram illustrating the functional configuration of the information processing apparatus according to the twelfth example embodiment.

As illustrated in FIG. 26, the information processing apparatus 10 according to the modified example of the tenth example embodiment includes, as components for realizing the functions thereof, the camera 18, the first illuminator 191, the second illuminator 192, the mirror 20, the mirror drive unit 630, the first transmission unit 621, and the second transmission unit 622. That is, in the modified example of the twelfth example embodiment, the mirror 20 is provided in addition to the configuration in the twelfth example embodiment (see FIG. 25), and the mirror drive unit 630 is provided in place of the camera drive unit 610.

The first transmission unit 621 according to the modified example is configured to shift the driving force outputted from the mirror drive unit 630 and to transmit it to the first illuminator 191. The second transmission unit 622 according to the modified example is configured to shift the driving force outputted from the mirror drive unit 630 and to transmit it to the second illuminator 192. The first transmission unit 621 and the second transmission unit 622 according to the modified example may include a transmission gear, for example.

According to the configuration described above, it is possible to transmit different driving forces to the mirror 20, the first illuminator 191, and the second illuminator 192. That is, the driving force outputted from the mirror drive unit 630 is transmitted to the mirror 18 as it is, whereas the driving force that is outputted from the mirror drive unit 630 and is then shifted by the first transmission unit 621, is transmitted to the first illuminator 191, and the driving force that is outputted from the mirror drive unit 630 and is then shifted by the second transmission unit 622, is transmitted to the second illuminator 192. As a result, the mirror 20, the first illuminator 191, and the second illuminator 192 have different angles of movement from each other.

Technical Effect

Next, a technical effect obtained by the information processing apparatus 10 according to the twelfth example embodiment will be described.

As described in FIG. 25 and FIG. 26, in the information processing apparatus 10 according to the twelfth example embodiment, the driving force for changing the capturing range of the camera 18 is shifted and transmitted to the first illuminator 191 and the second illuminator 192. In this way, the angle at which the illumination range of the first illuminator 191 is changed and the angle at which the illumination range of the second illuminator 192 is changed may be set different from each other, and it is thus possible to change the illumination range, more properly, depending on the circumstances.

Thirteenth Example Embodiment

The information processing apparatus 10 according to a thirteenth example embodiment will be described with reference to FIG. 27 and FIG. 28. The thirteenth example embodiment is partially different from the eleventh example embodiment only in the configuration, and may be the same as the first to twelfth example embodiments in the other parts. For this reason, a part that is different from each of the example embodiments described above will be described in detail below, and a description of the other overlapping parts will be omitted as appropriate.

Functional Configuration

First, with reference to FIG. 27, a functional configuration of the information processing apparatus 10 according to the thirteenth example embodiment will be described. FIG. 27 is a block diagram illustrating the functional configuration of the information processing apparatus according to the thirteenth example embodiment. In FIG. 27, the same components as those illustrated in FIG. 21 carry the same reference numerals.

Figure 27:
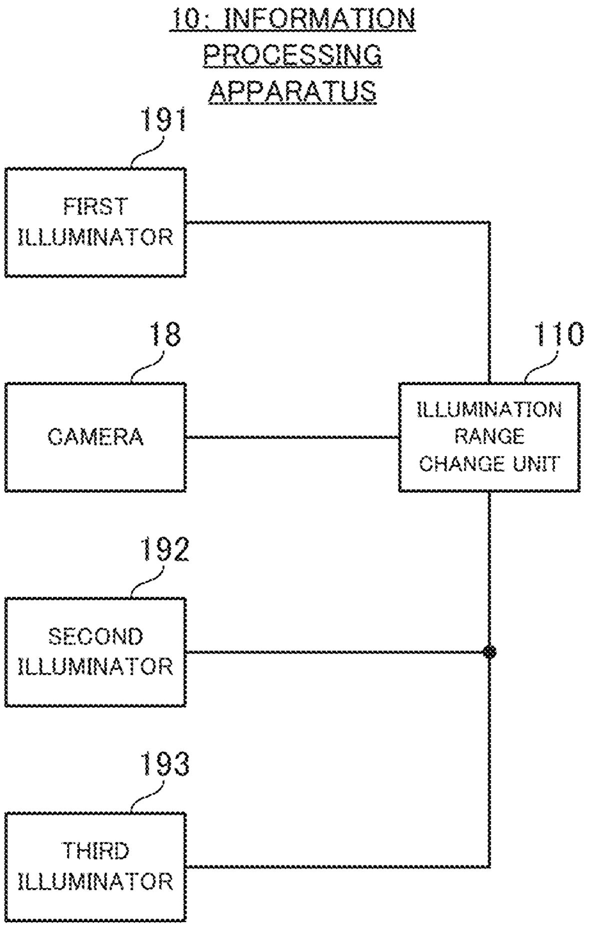
FIG. 27 is a block diagram illustrating a functional configuration of an information processing apparatus according to a thirteenth example embodiment.

As illustrated in FIG. 27, the information processing apparatus 10 according to the thirteenth example embodiment includes, as components for realizing the functions thereof, the camera 18, the first illuminator 191, the second illuminator 192, a third illuminator 193, and the illumination range change unit 110. That is, the information processing apparatus 10 according to the thirteenth example embodiment further includes the third illuminator 193 in addition to the configuration in the eleventh example embodiment (see FIG. 21).

The third illuminator 193 is configured to apply illumination light when the target is captured, as in the first illuminator 191 and the second illuminator 192. The third illuminator 193 is configured to change the illumination range in a different aspect from those of the first illuminator 191 and second illuminator 192. For example, when the first illuminator 191 and the second illuminator 192 are configured to change the illumination range by using the belts 301 and 302 as described in the eleventh example embodiment (see FIG. 24), the third illuminator 193 may be configured to change the illumination range by using the gear 501 and the rack 502 as described in the ninth example embodiment (see FIG. 18). The third illuminator 193, however, may be configured to change the illumination range in another aspect.

The third illuminator 193 is provided in a third direction that is different from any of the first direction in which the first illuminator 191 is provided, and the second direction in which the second illuminator 192 is provided, when viewed from the camera 18. Therefore, the first illuminator 191, the second illuminator 192, and the third illuminator 193 are provided in different directions when viewed from the camera 18.

Specific Arrangement Examples

Next, with reference to FIG. 28, a specific arrangement example of each member in the information processing apparatus 10 according to the thirteenth example embodiment will be described. FIG. 28 is a front view illustrating the arrangement example of each member in the information processing apparatus according to the thirteenth example embodiment. In FIG. 28, the same components as those illustrated in FIG. 23 carry the same reference numerals.

Figure 28:
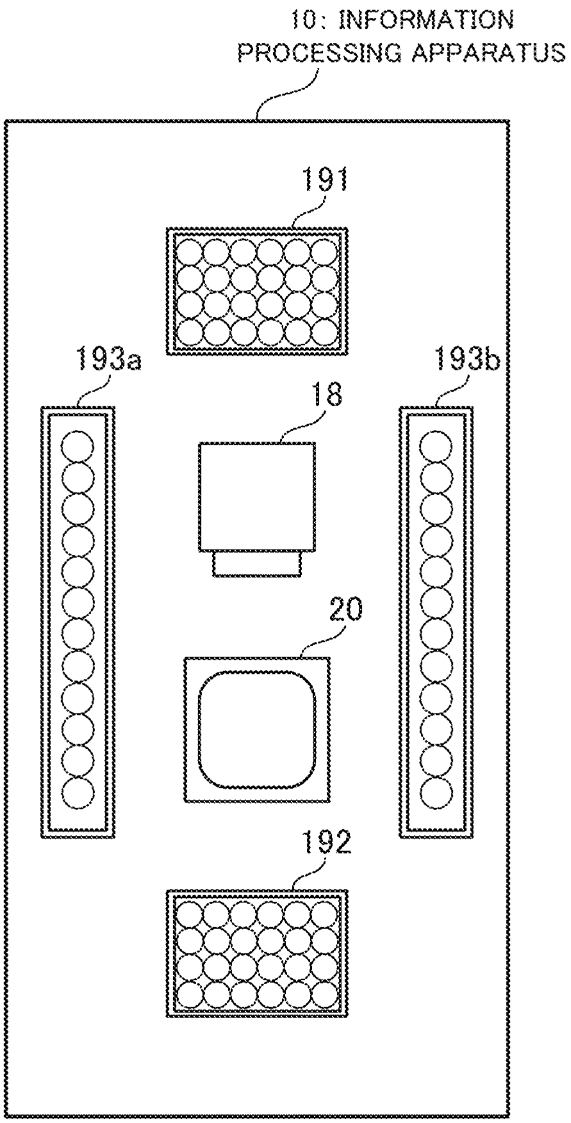
FIG. 28 is a front view illustrating an arrangement example of each member in an information processing apparatus according to a thirteenth example embodiment.

As illustrated in FIG. 28, in the information processing apparatus 10 according to the thirteenth example embodiment, the first illuminator 191 is disposed above the camera 18. Furthermore, the second illuminator 192 is disposed below the mirror 20. Then, a third illuminator **193*a* is disposed on the left side of the camera 18. A third illuminator 193*b* is disposed on the right side of the camera 18. Described here is an example in which two third illuminators 193 are disposed, but only one third illuminator 193 may be provided. Alternatively, three or more third illuminators 193** may be provided.

The arrangement described above is merely an example, and the first illuminator 191, the second illuminator 192, and the third illuminator 193 may be arranged differently from the above arrangement. For example, the first illuminator 191 may be disposed on the left side of the camera 18, the second illuminator 192 may be disposed on the right side of the camera 18, and the third illuminator 193 may be disposed above and below the camera 18.

Technical Effect

Next, a technical effect obtained by the information processing apparatus 10 according to the thirteenth example embodiment will be described.

As described in FIG. 27 and FIG. 28, in the information processing apparatus 10 according to the thirteenth example embodiment, the first illuminator 191, the second illuminator 192, and the third illumination are disposed in different directions when viewed from the camera 18. With this configuration, at least three illuminators are arranged at different positions, and it is thus possible to apply the illumination light, more properly, based on the position of the target. Since the third illuminator 193 is configured to change the illumination range in a different aspect from those of the first illuminator 191 and second illuminator 193, it is possible to perform more appropriate illumination, as compared with a case of applying the illumination light by using only the first illuminator and second illuminator.

Fourteenth Example Embodiment

The information processing apparatus 10 according to a fourteenth example embodiment will be described with reference to FIG. 29 and FIG. 30. The fourteenth example embodiment describes a specific example of a method of changing the illumination range of the third illuminator 193 in the thirteenth example embodiment, and may be the same as the first to thirteenth example embodiments in the other parts. For this reason, a part that is different from each of the example embodiments described above will be described in detail below, and a description of the other overlapping parts will be omitted as appropriate.

Switching of Illumination Range by ON/OFF

First, with reference to FIG. 29, the method of changing the illumination range of the third illuminator 193 in the information processing apparatus 10 according to the fourteenth example embodiment will be described. FIG. 29 is version 1 of a front view illustrating an example of changing the illumination range of the third illuminator in the information processing apparatus according to the thirteenth example embodiment.

As illustrated in FIG. 29, the third illuminator 193 according to the fourteenth example embodiment includes a plurality of lighting units 1935. In the example illustrated in FIG. 29, the plurality of lighting units 1935 are arranged side by side in a vertical row, but the arrangement of the lighting units 1935 is not limited to such an example.

Figure 29A:
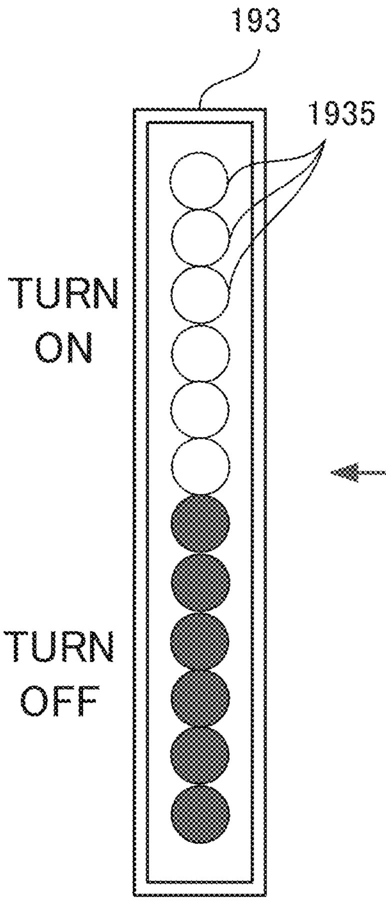
FIG. 29A is version 1 of a front view illustrating an example of changing an illumination range of a third illuminator in the information processing apparatus according to the thirteenth example embodiment.
Figure 29B:
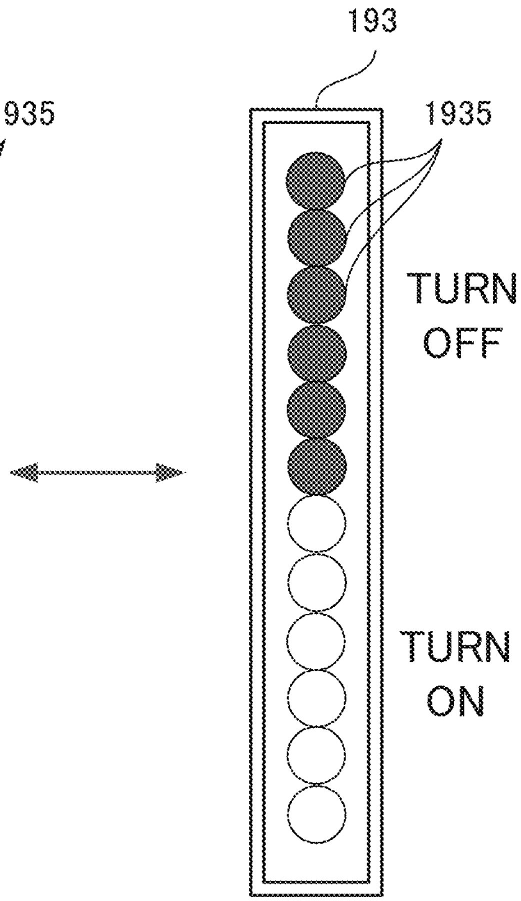
FIG. 29B is version 1 of a front view illustrating an example of changing an illumination range of a third illuminator in the information processing apparatus according to the thirteenth example embodiment.

The third illuminator 193 may be configured to change the illumination range by turning on a part of the plurality of lighting units 1935 and turning off a remaining part. Specifically, as illustrated in FIG. 29A, the illumination range may be changed to an upper side by turning on an upper half of the lighting units 1935 and turning off a lower half of the lighting units 1935. Furthermore, as illustrated in FIG. 29B, the illumination range may be changed to a lower side by turning on the lower half of the lighting units 1935 and turning off the upper half of the lighting units 1935.

The above describes an example in which different controls are performed in the two areas of the upper half and the lower half, but the same/similar control may be performed by dividing the third illuminator 193 into more areas. For example, the same/similar control may be performed by dividing the third illuminator 193 into three areas of upper, middle, and lower areas. Alternatively, turning on and turning off each of the plurality of lighting units 1935 may be controlled, separately.

Switching of Illumination Range by Intensity

Next, with reference to FIG. 30, a modified example of the method of changing the illumination range of the third illuminator 193 in the information processing apparatus 10 according to the fourteenth example embodiment will be described. FIG. 30 is version 2 of a front view illustrating the example of changing the illumination range of the third illuminator in the information processing apparatus according to the thirteenth example embodiment.

Figure 30A:
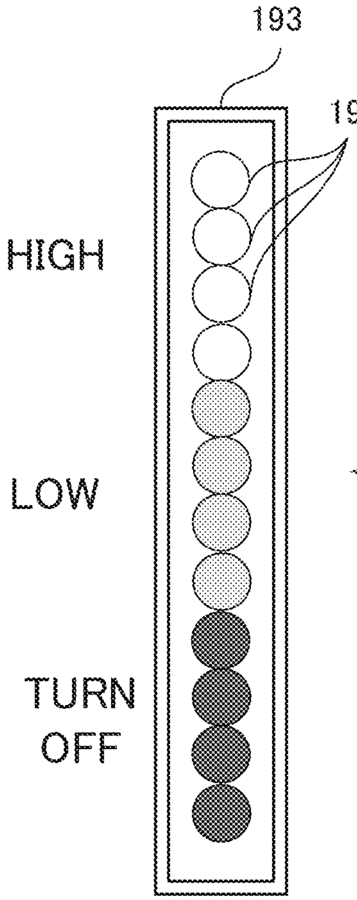
FIG. 30A is version 2 of a front view illustrating the example of changing the illumination range of the third illuminator in the information processing apparatus according to the thirteenth example embodiment.
Figure 30B:
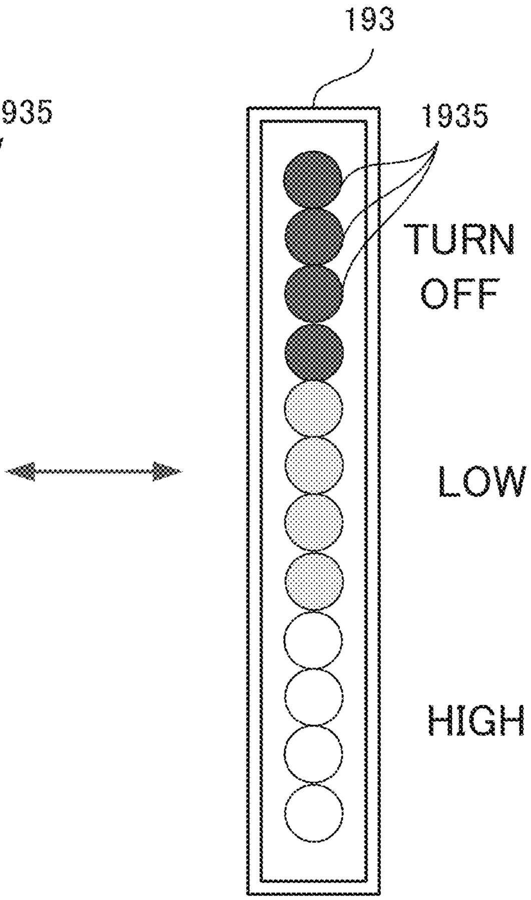
FIG. 30B is version 2 of a front view illustrating the example of changing the illumination range of the third illuminator in the information processing apparatus according to the thirteenth example embodiment.

As illustrated in FIG. 30, in the information processing apparatus 10 according to the modified example of the fourteenth example embodiment, the illumination range may be changeable by turning on and setting intensity of a part of the plurality of lighting units 1935 to be low, turning on and setting the intensity of a part thereof to be high, and turning off a remaining part. Specifically, as illustrated in FIG. 30A, the illumination range may be changed to the upper side by turning on and setting the intensity an upper part of the lighting units 1935 to be high, turning on and setting the intensity of a middle part of the lighting units 1935 to be low, and turning off a lower part of the lighting units 1935. Furthermore, the illumination range may be changed to the lower side by turning on and setting the intensity of the lower part of the lighting units 1935 to be high, turning on and setting the intensity of the middle part of the lighting units 1935 to be low, and turning off the upper part of the lighting units 1935.

The above describes an example in which different controls are performed in the three areas of the upper, middle, and lower areas, but the same/similar control may be performed by dividing the third illuminator 193 into more areas. For example, the intensity of lighting of and turning off each of the plurality of lighting units 1935 may be controlled, separately. Furthermore, the above describes an example in which the control is performed at three stages of high, low, and off, but the control may be performed at more stages. For example, the same/similar control may be performed at four stages of high, mild, low, and off, or the same/similar control may be performed at 100 stages of illumination intensity 0 to 99.

Technical Effect

Next, a technical effect obtained by the information processing apparatus 10 according to the fourteenth example embodiment will be described.

As described in FIG. 29 and FIG. 30, in the information processing apparatus 10 according to the fourteenth example embodiment, the illumination range of the third illuminator 193 is changed by separately changing an illumination aspect of each of the plurality of lighting units 1935. In this way, it is possible to properly change the illumination range of the third illuminator. Furthermore, since a mechanical movement is not required unlike the eighth example embodiment (i.e., the configuration that the driving force is transmitted through the belt) or the ninth example embodiment (i.e., the configuration that the driving force is transmitted through the gear and the rack) already described, it is possible to reduce wear of the apparatus.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

SUPPLEMENTARY NOTES

The example embodiments described above may be further described as, but not limited to, the following Supplementary Notes below.

Supplementary Note 1

An information processing apparatus according to Supplementary Note 1 is an information processing apparatus including: a camera that captures a target; an illuminator that applies illumination light in response to capturing is performed by the camera; and an illumination range change unit that changes an illumination range of the illuminator based on with a position of the target.

Supplementary Note 2

An information processing apparatus according to Supplementary Note 2 is the Information processing apparatus according to Supplementary Note 1, further including a capturing range change unit that changes a capturing range of the camera based on the position of the target, wherein the illumination range change unit changes the illumination range of the illuminator based on the change in the capturing range of the camera by the capturing range change unit.

Supplementary Note 3

An information processing apparatus according to Supplementary Note 3 is the information processing apparatus according to Supplementary Note 2, further including a mirror provided in the capturing range of the camera, wherein the capturing range change unit changes the capturing range of the camera by driving the mirror based on the position of the target, and the illumination range change unit changes the illumination range of the illuminator based on the driving of the mirror.

Supplementary Note 4

An information processing apparatus according to Supplementary Note 4 is the information processing apparatus according to Supplementary Note 3, wherein the mirror includes a first surface of a plane mirror and a second surface of a concave mirror, and the camera captures the target via the first surface in response to a distance to the target is a first distance, and captures the target via the second surface in response to the distance to the target is a second distance that is shorter than the first distance.

Supplementary Note 5

An information processing apparatus according to Supplementary Note 5 is the information processing apparatus according to Supplementary Note 4, further including a distortion correction unit that corrects a distortion of an image captured via the second surface.

Supplementary Note 6

An information processing apparatus according to Supplementary Note 6 is the information processing apparatus according to Supplementary Note 4 or 5, wherein the camera captures the target that is moving, and the information processing apparatus further comprises a second camera that captures the target that is stationary, apart from the camera.

Supplementary Note 7

An information processing apparatus according to Supplementary Note 7 is the information processing apparatus according to Supplementary Note 6, further including an authentication unit that performs authentication processing by using an image of the target, wherein the authentication unit performs the authentication processing by using a second image captured via the second surface in response to the distance to the target is the second distance, and performs the authentication processing by using a third image captured by the second camera in response to the distance to the target is a third distance that is shorter than the second distance, in a case where the authentication processing using a first image captured via the first surface at the first distance is failed.

Supplementary Note 8

An information processing apparatus according to Supplementary Note 8 is the information processing apparatus according to any one of Supplementary Notes 2 to 7, further including a belt that transmits a movement of the capturing range change unit to the illumination range change unit, wherein the illumination range change unit changes the illumination range of the illuminator based on the movement of the capturing range change unit transmitted through the belt.

Supplementary Note 9

An information processing apparatus according to Supplementary Note 9 is the information processing apparatus according to any one of Supplementary Notes 2 to 7, wherein the illumination range change unit includes: a holding unit that holds the illuminator; a rack coupled with the holding unit; and a gear that transmits a movement of the capturing range change unit to the rack, and the illumination range of the illuminator is changed by transmitting the movement of the capturing range change unit to the gear and moving the rack.

Supplementary Note 10

An information processing apparatus according to Supplementary Note 10 is the information processing apparatus according to any one of Supplementary Notes 2 to 9, wherein the illumination range change unit changes the illumination range of the illuminator at a different angle from the capturing range of the camera.

Supplementary Note 11

An information processing apparatus according to Supplementary Note 11 is the information processing apparatus according to any one of Supplementary Notes 1 to 10, wherein the illuminator includes a first illuminator disposed on a first direction side in response to viewed from the camera, and a second illuminator disposed on a second direction side that is different from the first direction side in response to viewed from the camera, and the illumination range change unit changes an illumination range of each of the first illuminator and the second illuminator based on the position of the target.

Supplementary Note 12

An information processing apparatus according to Supplementary Note 12 is the information processing apparatus according to Supplementary Note 11, wherein the illumination range change unit changes the illumination range of the first illuminator and the illumination range of the second illuminator at different angles from each other.

Supplementary Note 13

An information processing apparatus according to Supplementary Note 13 is the information processing apparatus according to Supplementary Note 11 or 12, further including a third illuminator that is configured to change an illumination range in a different aspect from those of the first illuminator and the second illuminator, and that is provided on a third direction side that is different from any of the first direction side and the second direction side in response to viewed from the camera.

Supplementary Note 14

An information processing apparatus according to Supplementary Note 14 is the information processing apparatus according to Supplementary Note 13, wherein the third illuminator includes a plurality of lighting units, and is configured to change the illumination range by separately changing respective illumination aspects of the plurality of lighting units.

Supplementary Note 15

An information processing method according to Supplementary Note 15 is an information processing method that is executed by at least one computer, the information processing method including: changing an illumination range of an illuminator that applies illumination light based on a position of a target; and controlling a camera to image the target.

Supplementary Note 16

A recording medium according to Supplementary Note 16 is a recording medium on which a computer program that allows at least one computer to execute an information processing method is recorded, the information processing method including: changing an illumination range of an illuminator that applies illumination light based on a position of a target; and controlling a camera to image the target.

Supplementary Note 17

A computer program according to Supplementary Note 17 is a computer program that allows at least one computer to execute an information processing method, the information processing method including: changing an illumination range of an illuminator that applies illumination light based on a position of a target; and controlling a camera to image the target.

Supplementary Note 18

An information processing system described in Supplementary Note 18 is an information processing system including: a camera that captures a target; an illuminator that applies illumination light in response to capturing is performed by the camera; and an illumination range change unit that changes an illumination range of the illuminator based on with a position of the target.

This disclosure is allowed to be changed, if desired, without departing from the essence or spirit of this disclosure which can be read from the claims and the entire specification. An information processing apparatus, an information processing method, and a recording medium with such changes are also intended to be within the technical scope of this disclosure.

DESCRIPTION OF REFERENCE CODES

10 Information processing apparatus
11 Processor
18 Camera
19 Illuminator
191 First illuminator
192 Second illuminator
193 Third illuminator
1935 Lighting unit
20 Mirror
201 Plane mirror
202 Concave mirror
203 Central member
21 Still image camera
110 Illumination range change unit
120 Capturing range change unit
130 Distortion correction unit
140 Camera switching unit
150 Authentication unit
301, 302 Belt
401, 402, 403, 404 Coupling member
411, 412 Idler
501 Gear
502 Rack
511 First holding unit
512 Second holding unit
521 Rotary drive pin
522 Rotation center member
610 Camera drive unit
620 Transmission unit
621 First transmission unit
622 Second transmission unit
630 Mirror drive unit

What is claimed is:

1. An information processing apparatus comprising:
a camera that captures an image of a target;
an illuminator that illuminates the target;
at least one memory that is configured to store instructions; and
at least one processor that is configured to execute the instructions to:
change an illumination range of the illuminator based on with a position of the target,
change a capturing range of the camera based on the position of the target by moving a mirror based on the position of the target; and
change the illumination range of the illuminator based on the moving of the mirror,
wherein the mirror includes a planar surface and a concave surface, and the camera captures the target via the planar surface in response to a distance to the target is a first distance, and captures the target via the concave surface in response to the distance to the target is a second distance that is less than the first distance.

2. The information processing apparatus according to claim 1, wherein the at least one processor that is configured to execute the instructions to correct a distortion of an image captured via the concave surface.

3. The information processing apparatus according to claim 1, wherein the camera captures the target that is moving, and the information processing apparatus further comprises a second camera that captures the target that is stationary.

4. The information processing apparatus according to claim 3, wherein the at least one processor that is configured to execute the instructions to:

perform authentication processing using a first image captured by the camera via the planar surface in the response to the target being at the first distance;

perform the authentication processing using a second image captured by the camera via the concave surface in response to the distance to the target the second distance; and perform the authentication processing using a third image captured by the second camera in response to the distance to the target being less than the second distance, and the authentication processing using the first image being unsuccessful.

5. The information processing apparatus according to claim 1, further comprising a belt that moves when the mirror moves, wherein the illumination range of the illuminator changes based on movement of the belt.

6. The information processing apparatus according to claim 1, further comprising;

a rack coupled to the illuminator; and a gear that moves the rack, wherein the illumination range of the illuminator changes in response to the gear moving the rack.

7. The information processing apparatus according to claim 1, wherein the at least one processor that is configured to execute the instructions to:

rotate the illuminator by a first angle; and rotate the camera by a second angle;

wherein the first angle and second angel are different.

8. The information processing apparatus according to claim 1, wherein the illuminator includes a first illuminator and a second illuminator, wherein the first illuminator is separated from the second illuminator, and wherein the illumination range of each of the first illuminator and the second illuminator is changed based on the position of the target.

9. The information processing apparatus according to claim 8, wherein the at least one processor is configured to execute the instructions to:

rotate the first illuminator by a first angle; and rotate the second illuminator by a second angle;

wherein the first angle and second angle are different.

10. The information processing apparatus according to claim 8, further comprising a third illuminator that is separated from the first illuminator and the second illuminator, wherein the at least one processor is configured to execute the instructions to:

rotate the first illuminator by a first angle; and rotate the second illuminator by a second angle;

rotate the third illuminator by a third angle;

wherein the first angle, second angle and third angle are different.

11. The information processing apparatus according to claim 10, wherein the third illuminator includes a plurality of lighting units and is configured to change its illumination range by separately changing respective illumination aspects of the plurality of lighting units.

12. An information processing method that is executed by at least one computer, the information processing method comprising:

changing an illumination range of an illuminator that illuminates a target based on a position of the target; and capturing an image of the target with a camera, changing a capturing range of the camera based on the position of the target by moving a mirror based on the position of the target; and changing the illumination range of the illuminator based on the moving of the mirror, wherein the mirror includes a planar surface and a concave surface, and the camera captures the target via the planar surface in response to a distance to the target is a first distance, and captures the target via the concave surface in response to the distance to the target is a second distance that is less than the first distance.

13. A non-transitory recording medium on which a computer program that allows at least one computer to execute an information processing method is recorded, the information processing method including:

changing an illumination range of an illuminator that illuminates a target based on a position of the target; and capturing an image of the target with a camera, changing a capturing range of the camera based on the position of the target by moving a mirror based on the position of the target; and changing the illumination range of the illuminator based on the moving of the mirror, wherein the mirror includes a planar surface and a concave surface, and the camera captures the target via the planar surface in response to a distance to the target is a first distance, and captures the target via the concave surface in response to the distance to the target is a second distance that is less than the first distance.

14. The non-transitory recording medium according to claim 13, wherein the information processing method further includes correcting a distortion of an image captured via the concave surface.

15. The non-transitory recording medium according to claim 13, wherein the camera captures the target that is moving, and the information processing method further includes capturing, by a second camera, the target that is stationary.

16. The non-transitory recording medium according to claim 15, wherein the information processing method further includes:

performing authentication processing using a first image captured by the camera via the planar surface in the response to the target being at the first distance;

performing the authentication processing using a second image captured by the camera via the concave surface in response to the distance to the target the second distance; and performing the authentication processing using a third image captured by the second camera in response to the distance to the target being less than the second distance, and the authentication processing using the first image being unsuccessful.

* * * * *